US012679103B2

(12) United States Patent
Sagae et al.

(10) Patent No.: US 12,679,103 B2
(45) Date of Patent: Jul. 14, 2026

(54) LIQUID DISCHARGE HEAD AND LIQUID DISCHARGE APPARATUS

(71) Applicants: Eiri Sagae, Kanagawa (JP); Tomoko Kurosawa, Kanagawa (JP); Makito Nakashima, Kanagawa (JP); Toshihiro Kanematsu, Kanagawa (JP)

(72) Inventors: Eiri Sagae, Kanagawa (JP); Tomoko Kurosawa, Kanagawa (JP); Makito Nakashima, Kanagawa (JP); Toshihiro Kanematsu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 166 days.

(21) Appl. No.: 18/393,703

(22) Filed: Dec. 22, 2023

(65) Prior Publication Data

US 2024/0208238 A1 Jun. 27, 2024

(30) Foreign Application Priority Data

Dec. 27, 2022 (JP) ................................ 2022-209305

(51) Int. Cl.
*B41J 2/175* (2006.01)
*B41J 2/045* (2006.01)

(52) U.S. Cl.
CPC ....... *B41J 2/17596* (2013.01); *B41J 2/04581* (2013.01)

(58) Field of Classification Search
CPC .................................................... B41J 2202/05
See application file for complete search history.

(56) References Cited

U.S. PATENT DOCUMENTS

2014/0084202 A1* 3/2014 Mevius .............. G05D 16/0688 251/359
2015/0368129 A1 12/2015 Zama et al.
2016/0176196 A1* 6/2016 Guidotti ............... B41J 2/17596 347/85
2016/0185111 A1* 6/2016 Wallsten .............. B41J 2/17596 347/54
2018/0326195 A1 11/2018 Yamabe et al.
2019/0100008 A1 4/2019 Sugai
(Continued)

FOREIGN PATENT DOCUMENTS

JP H08-284995 A 11/1996
JP 2008-126596 A 6/2008
(Continued)

OTHER PUBLICATIONS

Extended European Search Report issued Apr. 3, 2024 in European Patent Application No. 23218027.3, 7 pages.

*Primary Examiner* — Shelby L Fidler
(74) *Attorney, Agent, or Firm* — XSENSUS LLP

(57) ABSTRACT

A liquid discharge head includes: a discharge port through which a liquid is discharged in a discharge direction; a valve body to openably close the discharge port; and a driver coupled to the valve body to move the valve body in the discharge direction, wherein the valve body includes: an elastic member including: a first elastic portion having a first elastic modulus; and a second elastic portion having a second elastic modulus different from the first elastic modulus, the elastic member to contact the discharge port to close the discharge port; and a core attached to the elastic member to support the elastic member.

15 Claims, 22 Drawing Sheets

(56) References Cited

U.S. PATENT DOCUMENTS

| | | | |
|---|---|---|---|
| 2020/0039217 | A1 | 2/2020 | Kaiba et al. |
| 2020/0297549 | A1 | 9/2020 | Kanematsu et al. |
| 2023/0294412 | A1 | 9/2023 | Kurosawa et al. |
| 2023/0373214 | A1 | 11/2023 | Kawakami et al. |

FOREIGN PATENT DOCUMENTS

| | | | |
|---|---|---|---|
| JP | 2020-023177 | A | 2/2020 |
| JP | 2023-097889 | A | 7/2023 |

* cited by examiner

FIG. 12B-1 COMPARATIVE EXAMPLE 1
FIG. 12B-2 COMPARATIVE EXAMPLE 1
FIG. 12B-3 COMPARATIVE EXAMPLE 1
FIG. 12B-4 COMPARATIVE EXAMPLE 1

COMPARATIVE EXAMPLE 2

COMPARATIVE EXAMPLE 2

COMPARATIVE EXAMPLE 2

COMPARATIVE EXAMPLE 2

COMPARATIVE EXAMPLE 2

COMPARATIVE EXAMPLE 2

WIDE GAP
310
40
15
14
GAP

NARROW GAP
310
40
15
14

CONTACT WITH NOZZLE
310
40
15
14

COMPRESSION OF RESIN ON-OFF VALVE
310
40
15
14

(a)
(b)(c)
(d)
LIQUID DISCHARGE AMOUNT (mℓ/min)
30
20
10
0
−18
−12
−6
0
6
DISPLACEMENT H (μm)

PIEZOELECTRIC ELEMENT OF ON-OFF VALVE
RESIN ON-OFF VALVE
STACK PZT
SHAFT PORTION
PIEZOELECTRIC DISPLACEMENT
H
LIQUID DISCHARGE AMOUNT
NOZZLE PLATE

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-209305, filed on Dec. 27, 2022, in the Japan Patent Office, the entire disclosure of which is hereby incorporated by reference herein.

BACKGROUND

Technical Field

The present embodiment relates to a liquid discharge head and a liquid discharge apparatus.

Related Art

A liquid discharge apparatus of a valve nozzle type uses an on-off valve to open and close a discharge port (a nozzle) for discharging liquid.

For example, a liquid discharge head presses a movable valve body toward a discharge port for discharging liquid, to control liquid discharge. In this liquid discharge head, a recess is formed at a position at which the recess faces the discharge port of the valve body. The tip portion of the valve body is formed with an elastic resin.

SUMMARY

In an aspect of the present disclosure, a liquid discharge head includes: a discharge port through which a liquid is discharged in a discharge direction; a valve body to openably close the discharge port; and a driver coupled to the valve body to move the valve body in the discharge direction, wherein the valve body includes: an elastic member including: a first elastic portion having a first elastic modulus; and a second elastic portion having a second elastic modulus different from the first elastic modulus, the elastic member to contact the discharge port to close the discharge port; and a core attached to the elastic member to support the elastic member.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 12A-1 to 12A-4 and 12B-1 to 12B-4 are views for explaining a difference in the effect to prevent retraction of the end face of an on-off valve;

FIGS. 21A-1 and 21A-2 and FIGS. 21B-1 and 21B-2 are views illustrating a difference in the opening/closing amount between the configuration according to this example and the configuration according to Comparative Example 2;

FIGS. 22A-1 to 22A-4 and 22B-1 to 22B-4 are views illustrating a difference in opening/closing drive operation of the on-off valve between the configuration according to this example and the configuration according to Comparative Example 2;

Figure 1A:
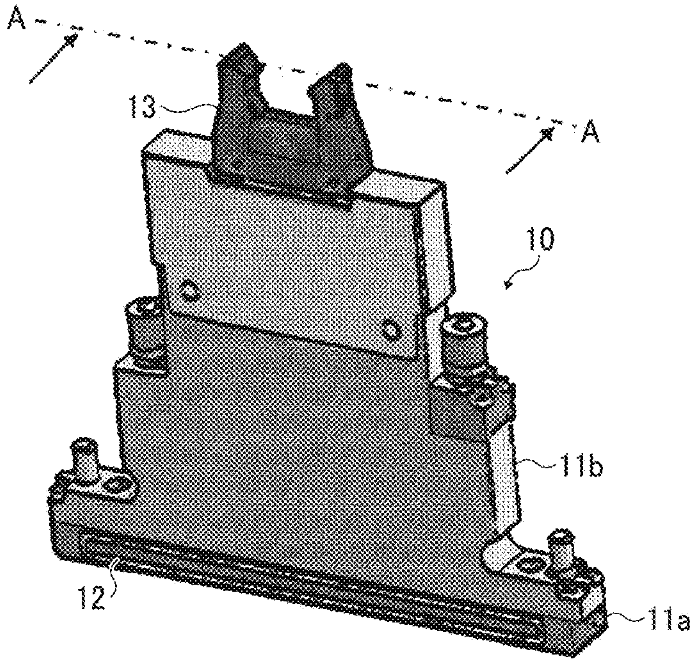
FIGS. 1A and 1B are external perspective views of a liquid discharge head according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a." "an," and "the" are intended to include the plural forms as well, unless the context clearly indicates otherwise.

Hereinafter, embodiments for carrying out the invention will be described with reference to the drawings. In the description of the drawings, the same elements are denoted by the same reference numerals, and redundant description is omitted.

The following is a description of an embodiment, with reference to the drawings.

In the description below, the present embodiment is described with reference to the accompanying drawings. In the drawings for explaining the present embodiment, components and parts having the same functions or shapes are denoted by the same reference numerals in a distinguishable manner, and explanation of them will be made only once.

Figure 1B:
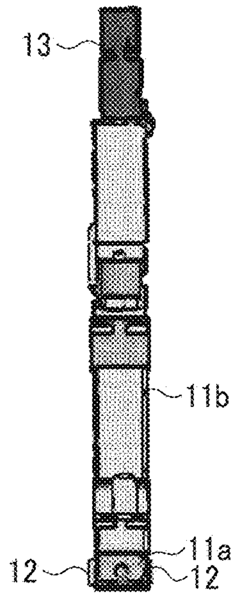

FIGS. 1A and 1B are external views of a liquid discharge head according to the present embodiment. FIG. 1A is a perspective view of an entire liquid discharge head (an example of a liquid discharge head), and FIG. 1B is a side view of the entire liquid discharge head. The liquid discharge head according to the present embodiment discharges ink as liquid from a nozzle 14 in a discharge direction that is a downward direction in FIGS. 4A and 4B.

A liquid discharge head 10 includes a first housing 11*a* as a first casing and a second housing 11*b* as a second casing. The second housing 11*b* is stacked on and bonded to the first housing 11*a*. The first housing 11*a* is formed with a material having high thermal conductivity such as a metal, and the second housing 11*b* is formed with the same material as the first housing 11*a*. In the description that follows, the two housings will be collectively referred to as the housing 11.

The first housing 11*a* has heaters 12 as a heating unit on its front and back surfaces. The heaters 12 can control temperature, and heat the first housing 11*a*. Meanwhile, the second housing 11*b* has a connector 13 for electric signal communication on its upper portion.

Figure 2:
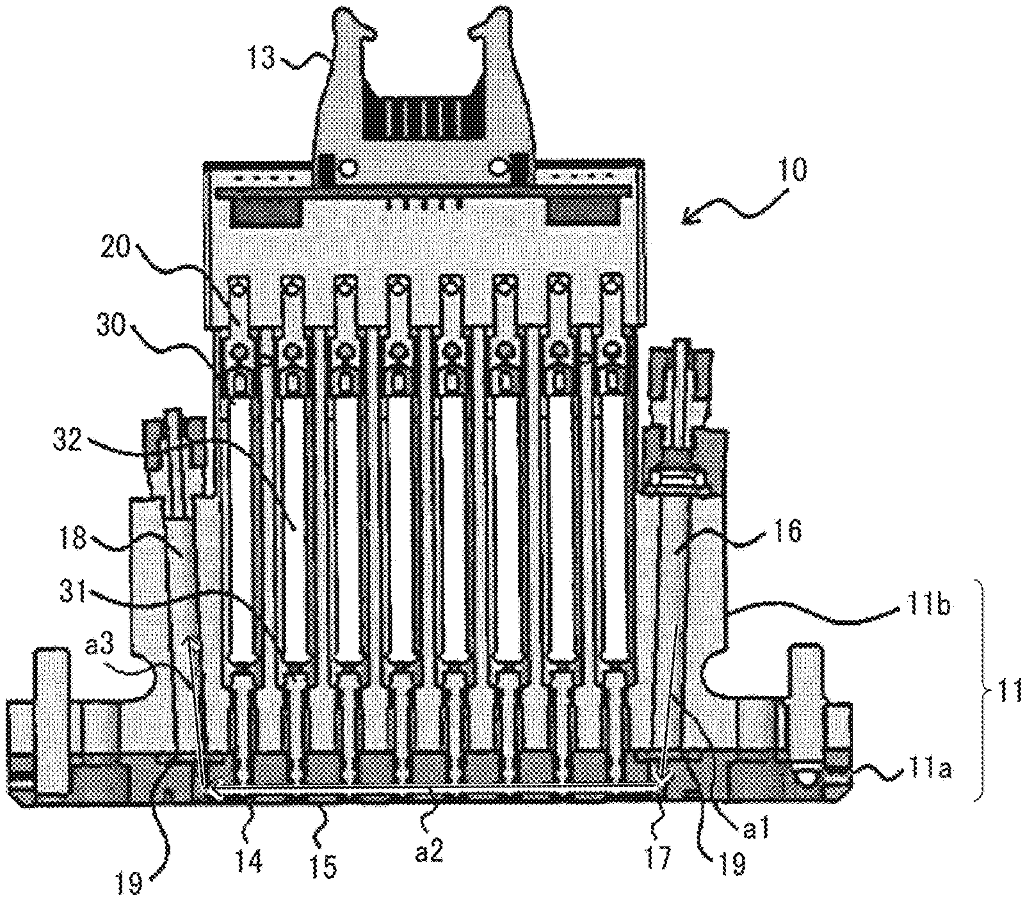
FIG. 2 is a cross-sectional view of the entire liquid discharge head according to the present embodiment.

FIG. 2 is a cross-sectional view of the entire liquid discharge head 10 according to the present embodiment, taken along the line A-A defined in FIG. 1A. The first housing 11*a* holds a nozzle plate 15 as a discharge port forming member. The nozzle plate 15 includes nozzles 14 (an example of discharge ports) as discharge ports for discharging liquid. The first housing 11*a* includes a channel 17 that is a liquid supply portion.

The channel 17 sends ink from the side of a supply port 16 to the side of a collection port 18 through the nozzle plate 15.

The second housing 11*b* includes the supply port 16 and the collection port 18. The supply port 16 and the collection port 18 are coupled to one side and the other side of the channel 17, respectively. A plurality of liquid discharge modules 30 is disposed between the supply port 16 and the collection port 18.

The liquid discharge modules 30 discharge the ink in the channel 17 from the nozzles 14. Further, a regulating member 20 is provided at an upper portion of each liquid discharge module 30.

The number of the liquid discharge modules 30 corresponds to the number of the nozzles 14 in the first housing 11*a*. In this example, eight liquid discharge modules 30 corresponding to eight nozzles 14 are arranged in one row. The number and arrangement of the nozzles 14 and the liquid discharge modules 30 are not limited to the above. For example, one nozzle 14 and one liquid discharge module 30 may be provided instead of a plurality of nozzles and a plurality of liquid discharge modules. The nozzles 14 and the liquid discharge modules 30 may be arranged in a plurality of rows instead of a single row.

In FIG. 2, reference numeral 19 indicates a housing sealing member provided at the joint portion between the first housing 11*a* and the second housing 11*b*. In this example, an O-ring is used as the housing sealing member, and the O-ring prevents leakage of ink from the joint portion between the first housing 11*a* and the second housing 11*b*.

With the above configuration, the supply port 16 takes in a pressurized ink from the outside, and sends the ink in the direction indicated by arrow a1, to feed the ink into the channel 17. The channel 17 sends the ink from the supply port 16 in the direction indicated by arrow a2. The collection port 18 then collects the ink not discharged from the nozzles 14 arranged along the channel 17 in the direction indicated by arrow a3.

Each liquid discharge module 30 includes an on-off valve 31 and a piezoelectric element 32 as a driver (an example of a drive unit). The on-off valve 31 is an example of a valve body, and may also be referred to as the valve body or the valve. The on-off valve 31 opens and closes the nozzle 14. The piezoelectric element 32 drives the on-off valve 31. When a voltage is applied, the piezoelectric element 32 expands and contracts in the longitudinal direction, which is the vertical direction in FIG. 2.

In the configuration described above, when the piezoelectric element 32 is operated to move the on-off valve 31 upward, the nozzle 14 closed by the on-off valve 31 is brought into an open state, so that ink can be discharged from the nozzle 14. When the piezoelectric element 32 is operated to move the on-off valve 31 downward, the tip portion of the on-off valve 31 seals the nozzle 14 to close the nozzle 14. Therefore, ink is not discharged from the nozzle 14. Thus, the piezoelectric element 32 moves (drives) the on-off valve 31 in the discharge direction.

Figure 3:
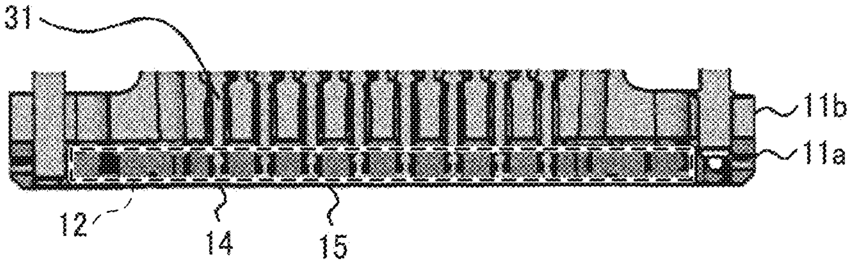
FIG. 3 is a view illustrating the position of a heater provided in a liquid discharge head.

FIG. 3 is an explanatory diagram illustrating the positional relationship between the liquid discharge head 10 and the heating unit according to the present embodiment. The first housing 11*a* includes the heaters 12. As indicated by dashed lines in FIG. 3, the heaters 12 are provided in the vicinity of the nozzles 14 so as to extend across the plurality of nozzles 14.

Figure 4A:
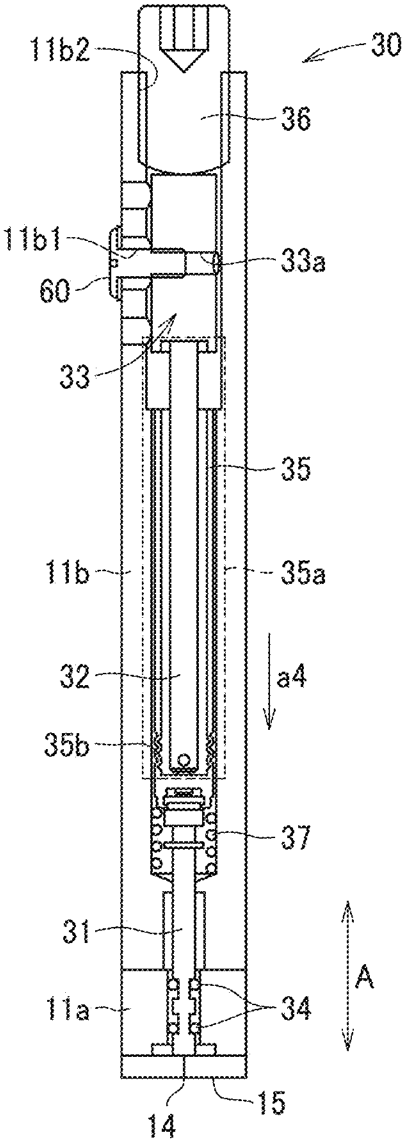
FIGS. 4A and 4B are cross-sectional views of the liquid discharge head.
Figure 4B:
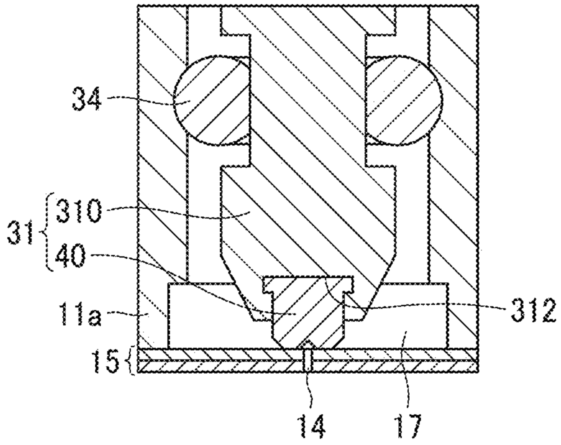

Next, a liquid discharge module 30 is described in detail, with reference to FIGS. 4A and 4B. FIG. 4A is a cross-sectional view of a single liquid discharge module, and FIG. 4B is an enlarged view of the relevant portion of FIG. 4A. An O-ring 34 is attached to the outer circumference of the shaft portion of the on-off valve 31 in upper and lower stages for preventing leakage of high-pressure ink.

In addition to the on-off valve 31 and the piezoelectric element 32 described above, the liquid discharge module 30 includes a securing member 33, a holder 35, and a plug 36.

The holder 35 has a driver accommodating portion 35*a* therein, and accommodates and holds the piezoelectric element 32 in the driver accommodating portion 35*a*. The holder 35 is formed with a metal that can elastically expand and contract in the longitudinal direction of the piezoelectric element 32. For example, stainless steel such as SUS304 or SUS316L can be used as the elastically expandable metal. The holder 35 is a frame member in which a plurality of elongated members extending in the longitudinal direction is disposed around the piezoelectric element 32 (for example, four elongated members are arranged at 90° intervals), and the piezoelectric element 32 is inserted into the holder 35 through a gap between the elongated members of the holder 35.

The longitudinal direction of the piezoelectric element 32 is the direction indicated by a double-headed arrow A in FIG. 4A, and this longitudinal direction A is also the longitudinal direction of the on-off valve 31, the liquid discharge module 30, and the second housing 11*b*. The longitudinal direction A is also the moving direction of the on-off valve 31 and the discharge direction of the liquid from the nozzle 14.

The on-off valve 31 is coupled to the tip portion of the holder 35 on the side of the nozzle 14. A bellows portion 35*b* is formed on the holder 35 on the side of the nozzle 14. The bellows portion 35*b* is used to expand and contract the tip side of the holder 35 in the longitudinal direction in a manner similar to the piezoelectric element 32 when the piezoelectric element 32 expands and contracts.

Further, the securing member 33 is coupled to the base end side of the holder 35, which is opposite side from the side of the nozzle 14. In other words, the securing member 33 is accommodated in the upper end portion of the second housing 11*b*.

The securing member 33 has a penetrating screw hole 33*a* extending in the radial direction. A positioning screw 60 is screwed into the penetrating screw hole 33*a* from the outside of the second housing 11*b*.

The positioning screw 60 is inserted into an elongated hole 11*b*1 that extends in the longitudinal direction and is formed in the upper end portion of the second housing 11*b*.

Thus, the positioning screw 60 is movable by a predetermined length in the longitudinal direction of the second housing 11*b*. The positioning screw 60 is fastened with the securing member 33 positioned in the longitudinal direction.

As illustrated in FIG. 4A, a female screw hole 11*b*2 is formed in the upper end opening of the second housing 11*b*. The plug 36 in contact with the regulating member 20 of FIG. 2 is screwed into the female screw hole 11*b*2. The plug 36 comes into contact with the upper end of the securing member 33 positioned in the longitudinal direction by the positioning screw 60, to finally secure the position of the securing member 33.

A compression spring 37 is disposed at the lower end portion of the second housing 11*b*. The piezoelectric element 32 and the holder 35 holding the piezoelectric element 32 are pushed upward by the compression spring 37.

As illustrated in FIG. 4B, the on-off valve 31 includes a core 310 and a columnar elastic member 40 (an example of an elastic member) that is a sealing member. The shaft-like core 310 is formed with a metallic material such as stainless steel. Although SUS 303 is used in the present embodiment, the present embodiment is not limited to this. The tip of the core 310 has a tapered shape with an inclination of about 20 degrees. A recess (also referred to as a recessed portion) 312 opened toward the nozzle 14 is formed at the end portion of the core 310 on the side of the nozzle 14. The elastic member 40 is formed with an elastic member such as a fluororesin like polytetrafluoroethylene (PTFE) or rubber, and is fitted into the recess 312 of the core 310, to be attached to the tip portion (the end portion on the side of the nozzle 14) of the core 310. Part of the elastic member 40 protrudes from the recess 312 of the core 310 toward the nozzle 14. Accordingly, when the on-off valve 31 is moved downward in FIG. 4A by an operation of the piezoelectric element 32, the elastic member 40 at the tip portion of the on-off valve 31 (the core 310) is pressed against the nozzle plate 15, and the nozzle 14 is sealed with the elastic member 40. Conversely, when the on-off valve 31 is moved upward in FIG. 4A, the elastic member 40 is moved away from the nozzle plate 15, and the nozzle 14 is opened. In this manner, the on-off valve 31 moves between the position at which the elastic member 40 is pressed against (brought into contact with) the nozzle plate 15 (the discharge port forming member) and the position at which the elastic member is separated from the nozzle plate 15, so that the nozzle 14 (the discharge port) is opened and closed.

Features in the Present Embodiment

Next, features in the present embodiment are described. First, an outline of the features of the present embodiment is briefly described. The elastic member to be used for the on-off valve has a configuration in which two or more kinds of materials that greatly differ in mechanical material characteristics are combined, with attentions being paid to the elastic modulus of the material of the elastic member and the yield point characteristic of plastic deformation. With such a configuration, in a case where an ink not containing any filler (a filler-less ink) is used, it is possible to provide an on-off valve for sealing that can reduce the retraction of the end face of the on-off valve (elastic member) during a long-time operation, and prevent liquid leakage. Further, in a case where an ink containing a filler (hard particles such as metal oxide or mica) is used, an on-off valve of a thin rubber material can be used in the device. This also prevents liquid leakage, and provides an on-off valve for sealing that can respond to a high frequency with a short stroke. Thus, heat generation is prevented, and residual vibration and the like is reduced.

In view of the above, the features of the present embodiment are roughly divided into two configurations: "a configuration to be adopted in a case where an ink not containing any filler (a filler-less ink) is used", and "a configuration to be adopted in a case where an ink containing a filler formed with hard particles is used". Here, the former is referred to as the feature 1, and the latter is referred to as the feature 2. First, the feature 1 is described.

Comparative Example 1

Here, before explanation is started regarding the feature 1 (a configuration to be adopted in a case where an ink not containing a filler (a filler-less ink) is used), a configuration to be compared (Comparative Example 1) is described, and the problem thereof is explained.

Figure 5:
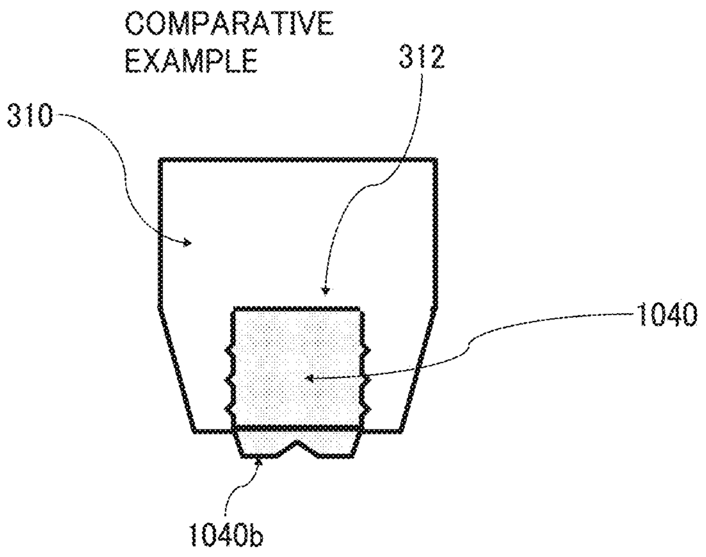
FIG. 5 is a diagram illustrating a configuration according to Comparative Example 1.

FIG. 5 illustrates a configuration according to Comparative Example 1. In a case where a filler-less ink is used, a sealing on-off valve formed with a resin such as a fluororesin is used. This is to fill a V-shaped groove with the member by press fitting. An elastic member 1040 is formed with a fluororesin. Therefore, the on-off valve 31 formed with a fluororesin whose shape easily conforms to the nozzle surface of the nozzle plate 15 that discharges liquid (ink) has the problem of liquid leakage over time due to retraction of an end face 1040*b* that is the end face of the elastic member 1040. A cause of this problem is described below in detail, with reference to FIGS. 12A and 12B.

Feature 1 in the Present Embodiment

Next, the feature 1 in the present embodiment is described with reference to FIG. 6.

Example 1

Figure 6:
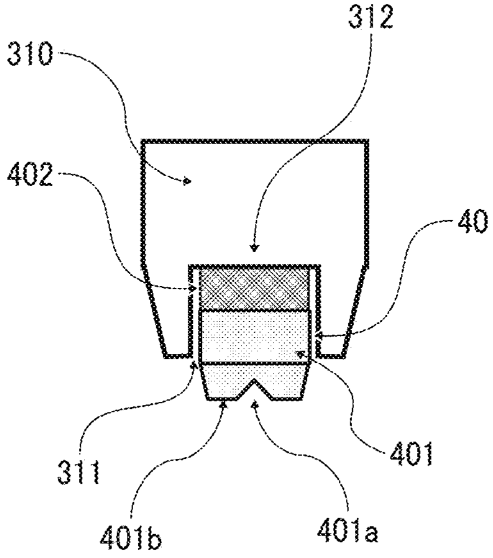
FIG. 6 is a diagram illustrating Example 1 of the present embodiment.

FIG. 6 is a diagram illustrating Example 1 of the present embodiment. Example 1 is a configuration that is adopted in a case where an ink not containing any filler (a filler-less ink) is used.

The outermost tip portion of a shaft-like core 310 has a flat recess 312 that can accommodate a columnar member in its central portion. A cylindrical elastic member 40 is provided on the tip side of the recess 312. In the elastic member 40, a discharge-side elastic portion 401 (an example of a first elastic portion) that is an elastic portion located on the discharge side, and a core-side elastic portion 402 (an example of a second elastic portion) that is an elastic portion located on the side of the core 310 are coupled as a two-layer structure. The two elastic portions differ from each other in elastic modulus. As for the material of the discharge-side elastic portion 401, a fluororesin polychlorotrifluoroethylene (PCTFE) is used. As for the material of the core-side elastic portion 402, a perfluoro-rubber sheet, FFKM or FFKO that is fluoro-rubber, or the like is used.

Thus, the liquid discharge head includes: a discharge port (14) through which a liquid is discharged in a discharge direction; a valve body (31) to openably close the discharge port (14); and a driver (32) coupled to the valve body to move the valve body (31) in the discharge direction, wherein the valve body (31) includes: an elastic member (40) including: a first elastic portion (401, 401*d*, 401*f*, 411, 411*s*) having a first elastic modulus; and a second elastic portion (402, 412, 402*a*, 402*b*) having a second elastic modulus different from the first elastic modulus, the elastic member (40) to contact the discharge port (14) to close the discharge port (14); and a core (310) attached to the elastic member (40) to support the elastic member (40).

The first elastic portion (401, 401*d*, 401*f*, 411, 411*s*) is closer to the discharge port (14) than the second elastic portion in the discharge direction, and the second elastic portion (402, 412, 402*a*, 402*b*) is closer to the core (310) than the first elastic portion (401, 401*d*, 40*ff*, 411, 411*s*) in the discharge direction.

The first elastic modulus of the first elastic portion (401, 401*d*, 401*f*, 411, 411*s*) is higher than the second elastic modulus of the second elastic portion (402, 412, 402*a*, 402*b*).

The elastic member 40 has a diameter $\Phi$ of 0.6 mm, and the inner diameter $\varphi$ of the hole of the recess 312 is 0.7 mm. There is a dimensional difference between the two diameters. A gap 311 (an example of a predetermined interval) is provided between the elastic member 40 and the core 310. The gap 311 is provided so as not to hinder deformation in the width direction (a direction orthogonal to the axial direction, which is the leftward direction in FIG. 6) when the elastic member 40 is subjected to a compressive force in the axial direction (a vertical direction in FIG. 6). Further, as the gap 311 is provided, it is possible to achieve an effect to facilitate the elastic member 40 to follow the inclined surface in a case where the nozzle plate 15 is inclined.

Here, the discharge-side elastic portion 401 protrudes from the end portion of the core 310 by about 100 μm. The protrusion is such that the core 310 does not come into contact with the nozzle plate 15 during the operation of sealing the hole of the nozzle 14. A recess 401*a* is formed at the end portion (an end face 401*b*) at the tip of the discharge-side elastic portion 401. The recess 401*a* has a function of ensuring a channel width for the time of discharge of a high-viscosity ink, to lower the fluid resistance.

As described above, the discharge-side elastic portion 401 is formed with a fluororesin. This resin characteristically has a higher elastic modulus than the elastic modulus of perfluoro-rubber, but has a low elastic limit (a small amount of strain) at which plastic deformation starts. Therefore, the characteristics are taken advantage of, to deform the shape so as to conform to the fine undulation or inclination of the nozzle plate 15. Thus, stable sealing can be performed with a small amount of crushing. The "small amount of crushing" mentioned here indicates that the piezoelectric element of the on-off valve is further moved forward for safety from the position at which the flow rate becomes zero, to crush and secure the resin portion in the elastic range in FIGS. 24A to 24F, which will be described later.

Here, the spring constant of the discharge-side elastic portion 401 is set to 1 to 2 N/μm, under the condition that "the diameter $\Phi$ of the elastic member is 0.5 to 1 mm, and a thickness of the elastic member is 500 μm". The spring constant of the discharge-side elastic portion 401 is set to 1 to 2 N/μm so that the discharge-side elastic portion 401 can appropriately close the nozzle 14 while the discharge-side elastic portion 401 is pressed against the nozzle plate 15 by the driver (piezoelectric element 32) such that the thickness of the discharge-side elastic portion 401 decreases by 1 to 2 μm.

The spring constant of the core-side elastic portion 402 is set to 0.05 to 1.0 N/μm, under the condition that "the diameter m of the elastic member is 0.5 to 1 mm, and the thickness thereof is 500 μm". If the spring constant is lower than 0.05 N/μm, the elastic portion is too soft, and its sealing function is lost. If the spring constant is higher than 1.0 N/μm, the elastic portion becomes too hard, and cannot receive an impact force from the side of the nozzle 14.

For such reasons, the value of the spring constant is set to the above value on the core side.

Meanwhile, the relationship between the thicknesses of the discharge-side elastic portion 401 and the core-side elastic portion 402 in the present embodiment is set as follows, with the spring constant being adjusted so as not to exceed the yield point, a 30 to 50% reduction in the target force generation being taken into account. First, with respect to compression in the thickness direction in a case where the diameter $\varphi$ of a cross-section is 0.5 to 1.0 mm, the discharge-side elastic portion 401 has a thickness of 0.45 mm when the spring constant is 1 N/μm, and the core-side elastic portion 402 has a thickness of 0.05 mm when the spring constant is 0.1 N/μm.

Thus, the discharge-side elastic portion (401, 401*d*, 401*f*, 411, 411*s*) has: a diameter of 0.5 to 1 mm and a thickness of 450 to 500 μm; and a spring constant of 1 to 2 N/μm, and the core-side elastic portion (402, 412, 402*a*, 402*b*) has: a diameter of 0.5 to 1 mm and a thickness of 50 to 500 μm; and a spring constant of 0.05 to 1 N/μm.

The discharge-side elastic portion (401, 401*d*, 401*f*, 411, 411*s*) may have: a diameter of 0.5 to 1 mm and a thickness of 450 to 500 μm; and a spring constant of 0.05 to 1 N/μm, and the core-side elastic portion (402, 412, 402*a*, 402*b*) may have: a diameter of 0.5 to 1 mm and a thickness of 50 to 500 μm; and a spring constant of 1 to 2 N/μm.

In the present embodiment, attention is paid to the mechanical characteristics of the resin member and the rubber member. To suppress excessive plastic deformation of the end face of the on-off valve, a material having lower elasticity and a wider elastic range than the material of the sealing face is included as a backup member. As a result, even when excessive compressive displacement occurs in the end face of the on-off valve (the elastic member), the backup member absorbs most of the displacement. Thus, retraction of the end face of the on-off valve (the elastic member) can be prevented.

In the present embodiment, the inner diameter of the hole of the recess 312 is straight, and there is no undercut or the like. Therefore, there is no need to have a divided structure for assembling the core 310, and thus, an effect of easy assembling can be achieved.

Figure 7A:
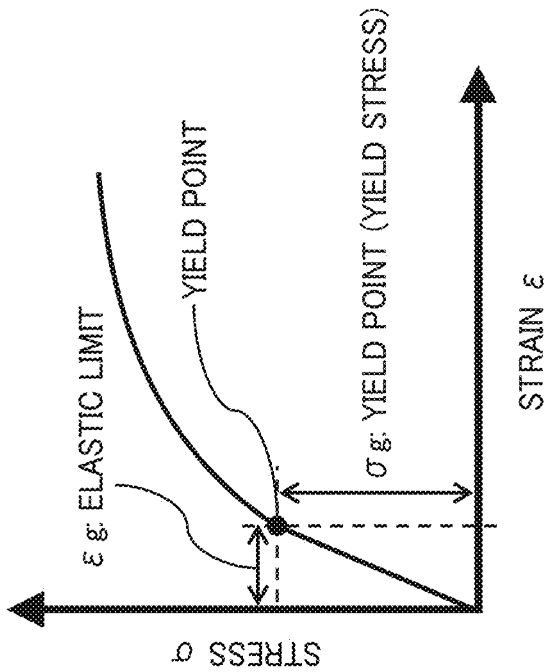
FIGS. 7A to 7C are graphs and a view regarding a method for evaluating mechanical characteristics of an elastic member.
Figure 7B:
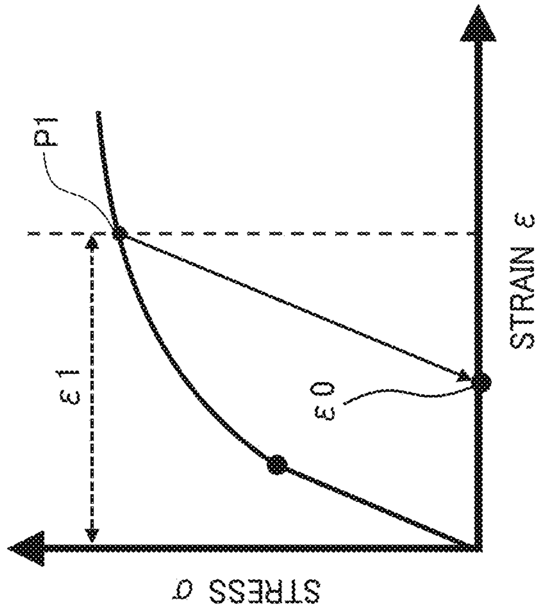
Figure 7C:
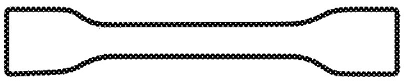

Principles of a Method for Reducing the Gap Between the End Face of the On-off Valve and the Nozzle Plate FIGS. 7A to 7C are graphs and a view for explaining a method for evaluating the mechanical characteristics of an elastic member. FIGS. 7A and 7B are graphs for explaining that plastic strain remains in the on-off valve (the elastic member) formed with a fluororesin according to the comparative example. FIG. 7C is a view of a dumbbell-shaped test piece. Regarding the mechanical characteristics in the evaluation method in FIGS. 7A to 7C, the results in a plastic tensile test (the plastics standards are compliant with JIS K 7161-1, ISO 527-1) using the dumbbell-shaped test piece illustrated in FIG. 7C are referred to.

First, explanation is made with reference to FIG. 7A. FIG. 7A illustrates the yield point and the elastic limit of the resin member. As illustrated in this drawing, attention is paid particularly to the inclination (Young's modulus) in the elastic range and the elastic limit that is the strain at the limit at which plastic deformation starts. Normally, ink sealing for the nozzle is performed by pressing within the elastic limit (the compressive strain illustrated in FIGS. 24A to 24F described later). However, an excessive strain εl is applied due to thermal deformation of the housing, thermal drift of a piezoelectric stroke, or the like in some cases. This is now described with reference to FIG. 7B. The stress generated at this point of time exceeds the yield point, and reaches a point P1 in FIG. 7B. After that, even when the strain applied by a releasing operation disappears, the strain is released parallel to the elastic inclination, and therefore, a plastic strain ϵ0 remains. This turns into a gap at the rated position in the next use, and ink liquid leakage (leak) occurs.

Figure 8A:
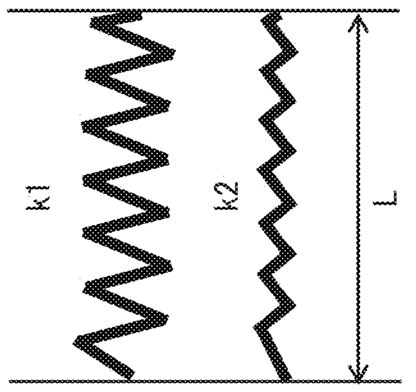
FIGS. 8A to 8C are graphs for explaining a combined elastic modulus when two different elastic members are stacked.
Figure 8B:
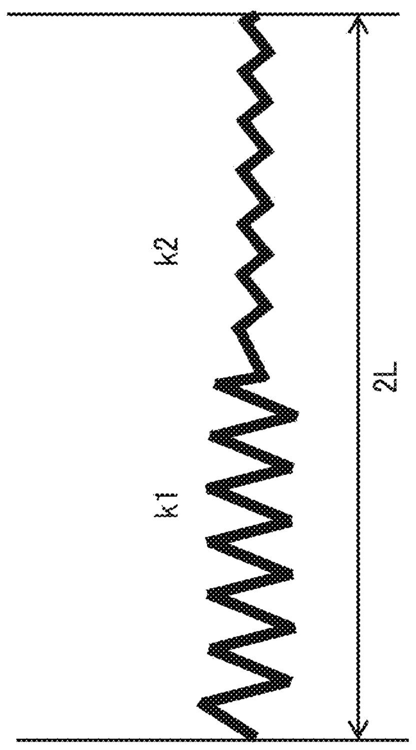
Figure 8C:
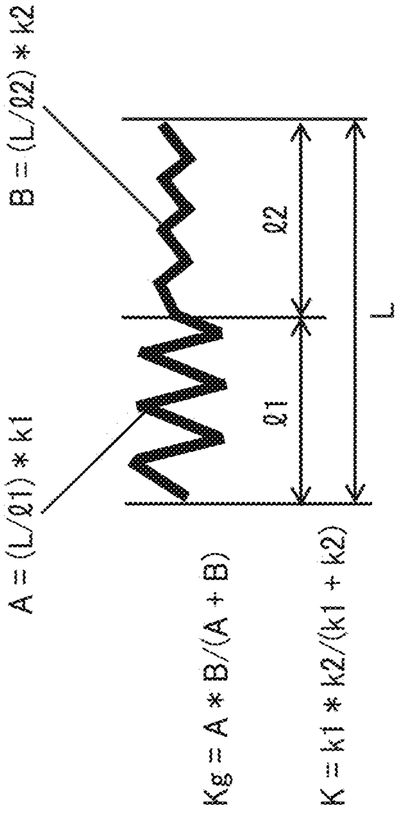

FIGS. 8A to 8C are graphs for explaining a compound elastic modulus that is observed when two different elastic members are stacked as in the present embodiment. For ease of explanation, the elastic modulus is explained in terms of the spring constant herein. It is known that the spring constant obtained when two different spring constants k1 and k2 are connected in series is normally calculated according to Expression K illustrated in the drawing. Expression K is, K=k1*k2/(k1+k2).

Here, as illustrated in FIG. 8A, the length of one elastic member is represented by L. At the time of series connection, the total length of the spring is 2 L as illustrated in FIG. 8B. In the present embodiment, the thickness of the elastic member (which is the length of the elastic member) is fixed, and L is constant, regardless of the presence or absence of compositing. Further, the spring constant of the combination obtained when springs that have the spring constants k1 and k2, and each have a length of L/2 are coupled to each other, and the total length is fixed is calculated according to Expression Kg illustrated in the drawing (FIG. 8C).

Figure 9:
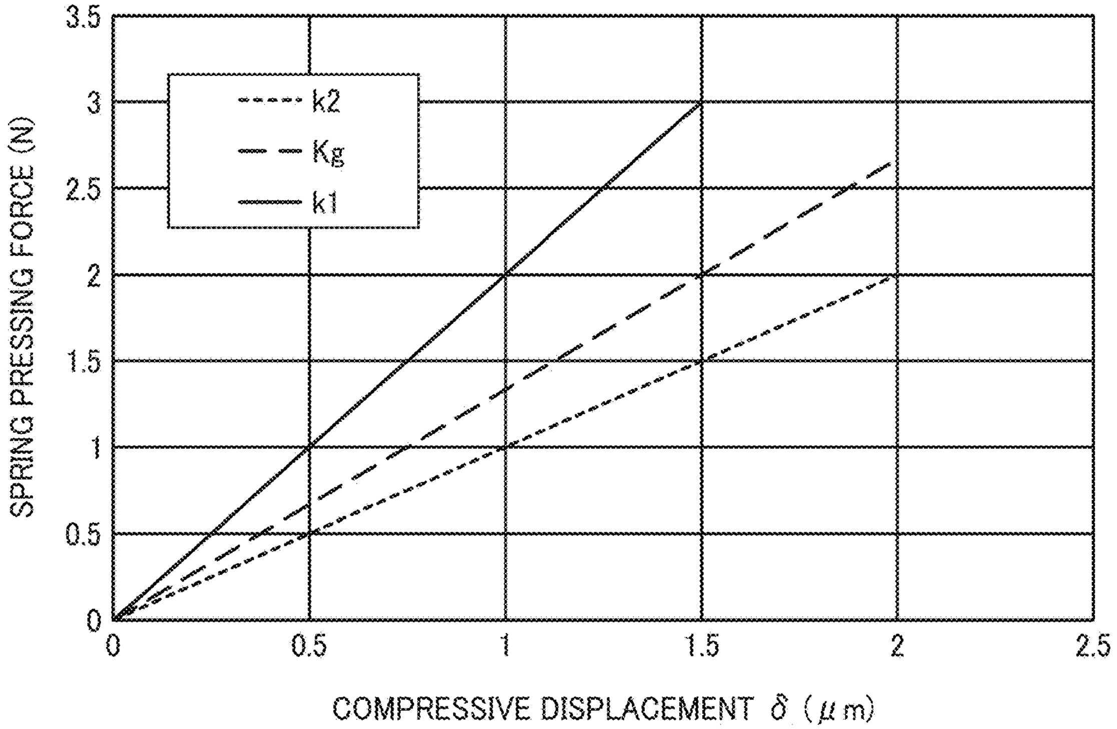
FIG. 9 is a graph illustrating a combined spring constant Kg when the spring constants are replaced with the spring constants k1 and k2 obtained in a case where the thicknesses of elastic members are halved.

FIG. 9 is a graph illustrating a combined spring constant Kg when the spring constants are replaced with the spring constants k1 and k2 obtained in a case where the thicknesses of the elastic members are halved. This graph takes into account the fact that the length of each spring is halved, and the spring constant is doubled. In this graph, a solid line indicates k1, a dotted line indicates k2, and a dashed line indicates Kg. When the spring constant k1 is set to 1 N/μm, and the spring constant k2 is set to 2 N/μm, the combined spring constant Kg with the fixed total length is 1.33 N/μm according to the expression mentioned above.

Here, a spring constant can be handled synonymously with a Young's modulus in the case of minute deformation in which the change in the cross-sectional area of the load surface is not taken into consideration. Therefore, when the elastic modulus of the discharge-side elastic portion 401 is E1, and the elastic modulus of the core-side elastic portion 402 is E2, E1 has an elastic modulus twice as large, and has a relationship E1=2*E2. Examples 1 to 5 of the feature 1 are described below based on this assumption.

Figure 10:
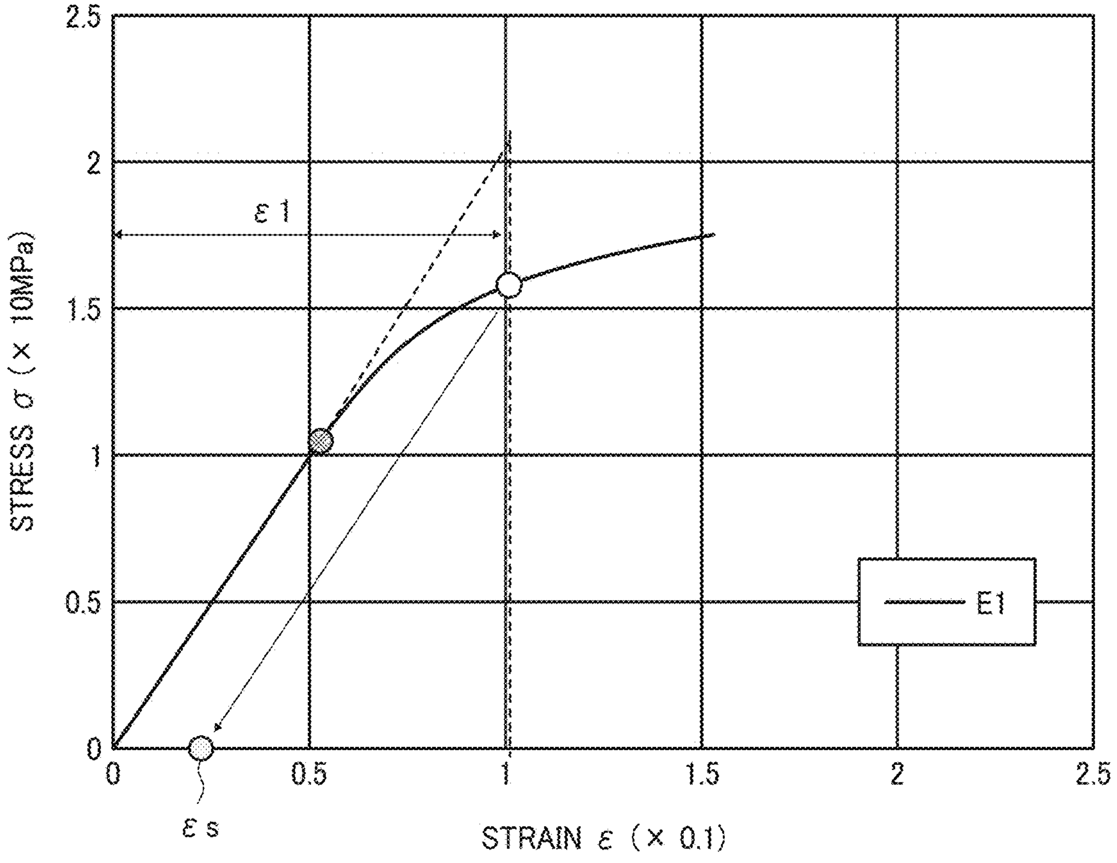
FIG. 10 is a graph for explaining a case where compressive strain is applied in the configuration according to Comparative Example 1.

FIG. 10 is a graph for explaining a case where compressive strain is applied in the configuration according to the comparative example (Comparative Example 1). Here, as illustrated in FIG. 10, in the configuration according to Comparative Example 1, a plastic strain εs remains when the compressive strain εl is received. That is, when the compressive strain εl is generated under a load exceeding the elastic limit, the strain does not completely become zero, and the plastic strain εs remains.

Figure 11B:
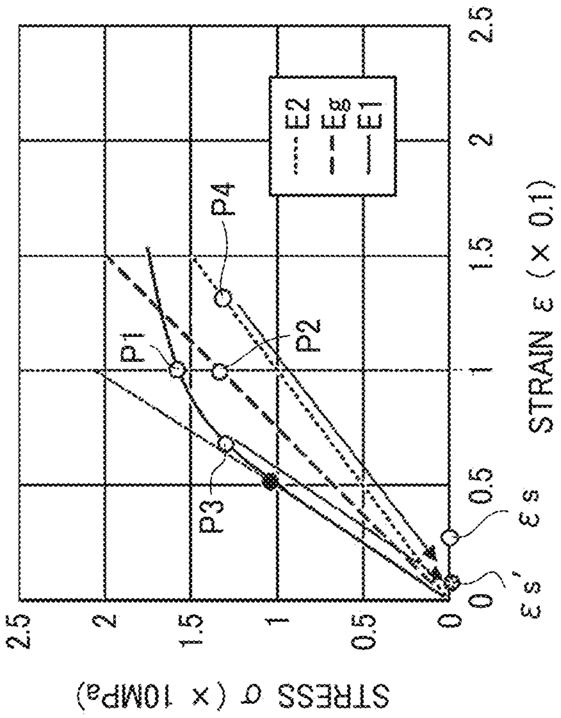
FIGS. 11A and 11B are graphs for explaining plastic strain observed when an elastic member is formed with a plurality of layers.
Figure 11A:
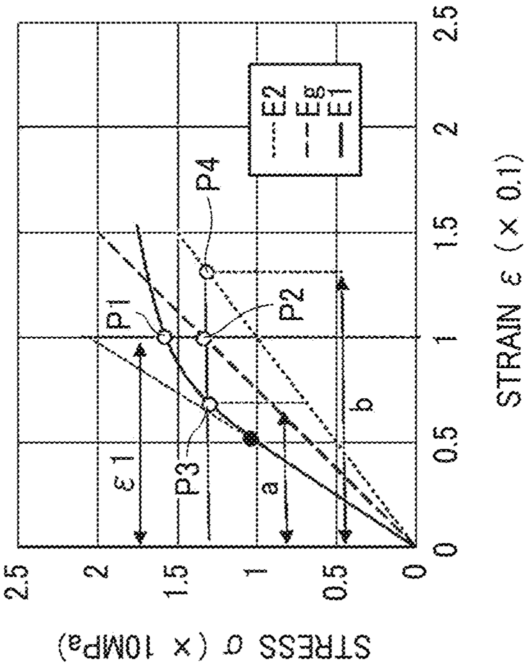

FIGS. 11A and 11B are graphs for explaining compressive stress when the elastic member is formed with a plurality of layers. FIGS. 11A and 11B illustrate example cases of Examples 1 to 5. Here, as illustrated in FIG. 11A, the combined Young's modulus is Eg, which is indicated by a dashed line in the graph, and the generated stress is reduced from P1 to P2 by this combined Young's modulus. The strain at that time is distributed to the respective elastic members at a ratio of length a:b=1:2 in the graph, and thus, the plastic strain is reduced. In this manner, the compressive stress when the elastic member is formed with a plurality of layers is reduced. Next, explanation is made with reference to FIG. 11B. FIG. 11B is a graph for explaining the plastic strain when the elastic member is formed with a plurality of layers. In FIG. 11B, P3 is closer to the yield point than P1, and accordingly, the plastic strain is reduced by that amount. P4 represents the elastic range of the core-side elastic portion, and no plastic strain is generated. The plastic strain is reduced from εs to εs' in FIG. 11B. Thus, plastic deformation is prevented, and the gap between the end face of the on-off valve (the elastic member) and the nozzle plate can be reduced.

Although the spring constant k1 is 1 N/μm, and the spring constant k2 is 2 N/μm herein as described above, this is merely an example of the principles of strain reduction. Even if the spring constant changes due to an increase in the number of elastic portions (elastic layers) constituting the elastic member, the fundamental idea does not change from the principles described above.

Difference in the Effect of Preventing Retraction of the End Face of the On-Off Valve FIGS. 12A-1 to 12A-4 and FIGS. 12B-1 to 12B-4 are cross-sectional views of On-Off Valve illustrating a difference in the effect of preventing retraction of the end face of the elastic member 1040 (on-off valve).

Figures 1, 2, 3, 4, 12A:
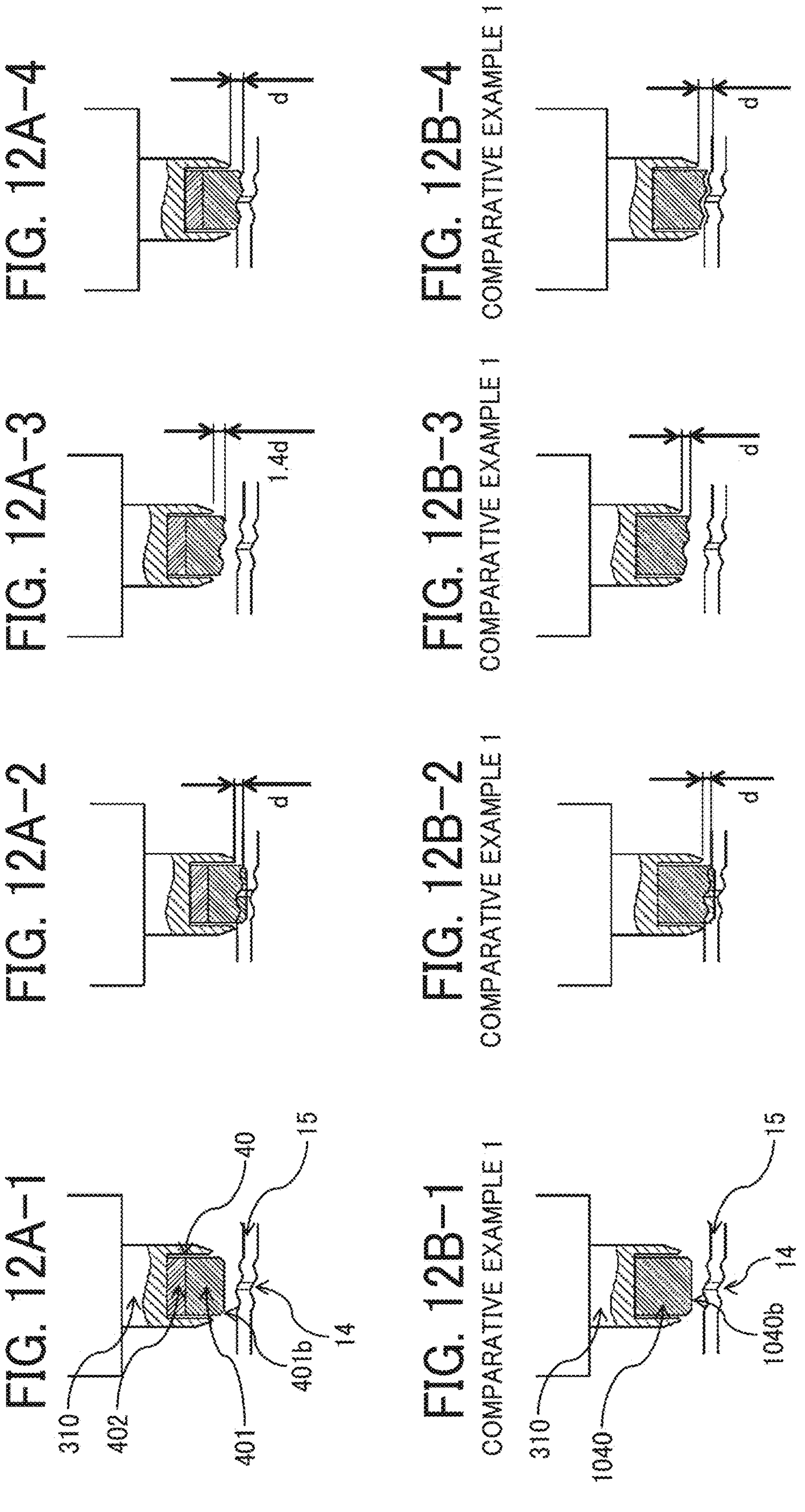

FIGS. 12A-1 to 12A-4 and FIGS. 12B-1 to 12B-4 each illustrate a behavior in which the elastic member 1040 (on-off valve) formed with a fluororesin conforms to the shape of a minute undulation 15*a* of an undulating nozzle plate 15. FIGS. 12A-1 to 12A-4 illustrate a configuration according to the present embodiment, and FIGS. 12B-1 to 12-B4 illustrate a configuration according to Comparative Example 1. The sequence in an opening/closing operation is illustrated in FIGS. 12A-1 to FIG. 12A-4, and FIGS. 12B-1 to FIG. 12B-4. First, the configuration according to Comparative Example 1 (the configuration illustrated in FIGS. 12B-1 to 12B-4) is described. Since these configurations are the same except for the opening and closing operation, reference signs are illustrated in FIG. 12A-1 and in FIG. 12B-1, but are not illustrated in the others.

First, FIGS. 12B-1 to 12B-4 illustrate a state in which the undulation 15*a* is excessively pressed to transfer the undulation to an end face 1040*b* of the elastic member 1040 (on-off valve), and the end portion of the core 310 is brought close to the nozzle plate 15 at a gap "d" and is then moved away from the core 310. In FIGS. 12B-1 to 12B-2, the end face 1040*b* comes into contact with the nozzle plate 15. FIG. 12B-3 illustrates a state in which the position of the core 310 is returned to the initial position illustrated in FIG. 12B-1.

As can be seen from FIG. 12B-3, the end face 1040*b* is deformed. In this case, if the fluororesin is completely plastically deformed, the amount of protrusion of the elastic member 1040 (on-off valve) decreases to the same amount as the gap amount "d" in of FIG. 12B-2, and therefore, the position of the end face 1040*b* of the elastic member 1040 (on-off valve) retracts. After that, in of FIG. 12B-4, the end portion of the core 310 is brought close to the nozzle plate 15 at the gap "d", so that the deformed end face 1040*b* again comes into contact with the nozzle plate 15. However, the amount of protrusion of the elastic member 1040 (on-off valve) decreases to the same amount as the gap amount "d", and the position of the end face 1040*b* of the elastic member 1040 (on-off valve) retracts. Therefore, the core 310 cannot sufficiently press the end face 1040*b* against the nozzle plate 15.

Here, the plasticity of the elastic member 1040 (on-off valve) enables shape transfer (including inclination) of the nozzle plate 15, but the position of the end face of the elastic member 1040 (on-off valve) retracts when plastic deformation advances to an excessive degree. At this point of time, in the opening/closing operation for displacement control such as piezoelectric driving, the sealing function deteriorates over time, leading to a liquid leakage failure. The elastic member 1040 (on-off valve) might then come into contact with the nozzle plate 15 more strongly than a predetermined stroke due to thermal deformation in the liquid discharge head in the actual operating state. At this point of time, if the above-described deformation remains, a gap appears during the sealing operation.

On the other hand, the present embodiment is as illustrated in FIGS. 12A-1 to 12A-4. First, in FIGS. 12A-1 to 12A-2, the end face 401*b* of the elastic member 40 comes into contact with the nozzle plate 15. At this point of time, the end portion of the core 310 is brought close to the nozzle plate 15 at the gap "d", and the elastic member 40 is compressed and deformed until the amount of protrusion of the elastic member 40 becomes equal to "d" FIG. 12A-3 illustrates a state in which the position of the core 310 is returned to the initial position illustrated in of FIG. 12A-1. As can be seen from FIG. 12A-3, the end face 401*b* is deformed. However, the core-side elastic portion 402 maintains displacement as an elastic strain. Accordingly, as illustrated in FIG. 12A-3, the amount of protrusion of the on-off valve 31 becomes 1.4 d, which is 1.4 times the previous amount of protrusion. That is, the position of the end face 401*b* of the elastic member 40 is recovered by 0.4 d.

After that, in FIG. 12A-4, the end portion of the core 310 is again brought close to the nozzle plate 15 at the gap "d", so that the end face 401*b* again comes into contact with the nozzle plate 15 in the recovered state. In this case, the amount of protrusion of the elastic member 40 is compressed by 0.4 d from 1.4 d to d (1.0 d), and thus, the end face 401*b* can be sufficiently pressed against the nozzle plate 15. As can be seen from this fact, the configuration according to the present embodiment has an effect to prevent retraction of the end face of the on-off valve 31, compared with the configuration according to Comparative Example 1. Although a maintenance cycle that is set due to compressive retraction of the fluororesin portion is three months, the cycle is about six months in the configuration according to the present embodiment, and the life can be extended to about twice the life in the configuration according to Comparative Example 1.

Other Examples Related to the Feature 1

Examples related to the feature 1 of the present embodiment include Examples 2 to 5, in addition to Example 1 described above. This example is described below.

Example 2

Figure 13:
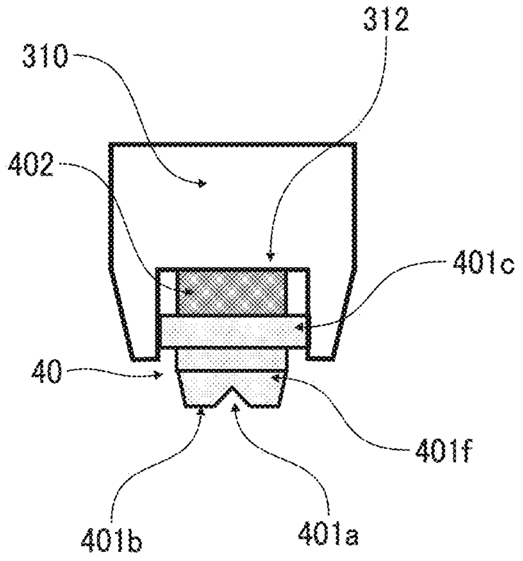
FIG. 13 is a view illustrating Example 2 of the present embodiment.

FIG. 13 is a view illustrating Example 2 of the present embodiment. Example 2 is also adopted in a case where an ink not containing any filler (a filler-less ink) is used.

The configuration according to this example differs from the configuration according to Example 1 in that a flange portion 401*c* is provided on the outer circumference of the discharge-side elastic portion to eliminate the gap between the core 310 and a discharge-side elastic portion 401*f* (an example of the first elastic portion). The other components in this example are similar to those in Example 1.

With this arrangement, it is possible to prevent the ink from entering the inside of the recess 312 at the tip of the core 310 (the position at which the core-side elastic portion 402 is located). For example, a material or an elastic body not resistant to ink can be used as the core-side elastic portion 402.

In this example, the inner diameter of the hole of the recess 312 is also straight without any undercut or the like. Accordingly, there is no need to have a divided structure for assembling the core 310.

Example 3

Figure 14:
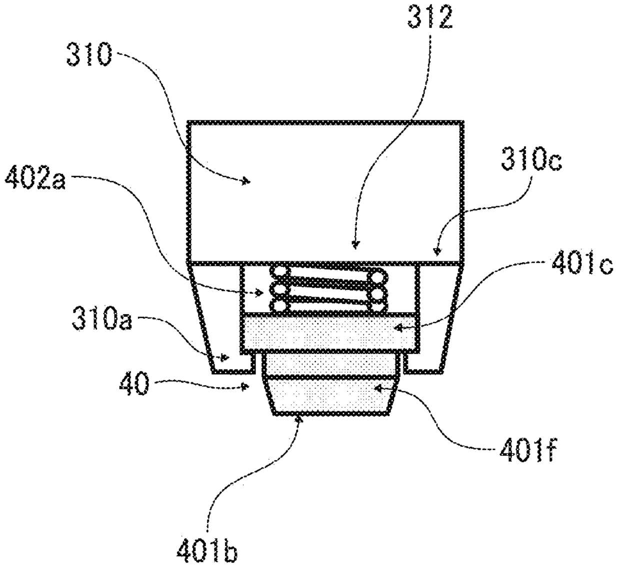
FIG. 14 is a view illustrating Example 3 of the present embodiment.

FIG. 14 is a view illustrating Example 3 of the present embodiment. Example 3 is also adopted in a case where an ink not containing any filler (a filler-less ink) is used.

In this example, the flange portion 401$c$ is provided on the outer circumference of the discharge-side elastic portion to eliminate the gap between the core 310 and the discharge-side elastic portion 401$f$, as in the configuration according to Example 2. Further, the core 310 has a hook-like holding portion 310$a$ that is an undercut. The core-side elastic portion 402 is not a rubber member, but a spring 402$a$ (an example of the second elastic portion) that is a coil spring is used. That is, this example is a configuration in which the core-side elastic portion 402, which is the elastic portion disposed on the core side (the back side) of the recess 312 with respect to the elastic member 40, is a spring. The other components in this example are similar to those in Example 1.

Here, in a case where a rubber member is used for the core-side elastic portion 402, the Young's modulus greatly drops, though the elastic range is normally wide. Therefore, when a plurality of elastic members formed with the rubber member is combined to form a combined structure, there is a problem in that the combined spring constant greatly drops. Therefore, a spring is used as the elastic member, to obtain great deformation and achieve a high Young's modulus. Thus, various sealing forms (variations in the amount of compression and the generated force) can be realized. The combined spring constant described above are as described with reference to FIG. 9.

In this example, the flange portion 401$c$ is provided on the outer circumference of the discharge-side elastic portion 401$f$ to eliminate the gap between the core 310 and the discharge-side elastic portion 401. However, there is a possibility that a very small amount of ink will enter the recess 312. In that case, the spring 402$a$ might be corroded by the ink. Therefore, it is preferable to use a corrosion-resistant metal such as a titanium alloy or Hastelloy® as the material of the spring 402$a$. Resin may also be used as the material of the spring 402$a$. In that case, a fluororesin may be used.

In this example, it may be difficult to join the discharge-side elastic portion 401$f$ and the spring 402$a$ with high accuracy. Therefore, as illustrated in FIG. 14, a hook-like holding portion 310$a$ (an example of a holding member) that is an undercut is formed on the side of the core 310. As a result, a preliminary pressure (preload) is applied, and a division line 310$c$ is formed so that the joining is performed at the location. Examples of the method of this coupling include bonding and fastening with a screw.

In this example, a coil spring is used as the spring 402$a$ as described above.

In this manner, the elastic energy per unit volume at the time of deformation is greater than the energy of any other spring component, and the energy absorption efficiency is high. Thus, there is an effect that the space necessary for attaching a spring can be made relatively small. Since the Young's modulus of a material is not used as it is as illustrated in FIG. 13, spring constants of various hardness can be achieved with the shapes of springs.

Example 4

Figure 15:
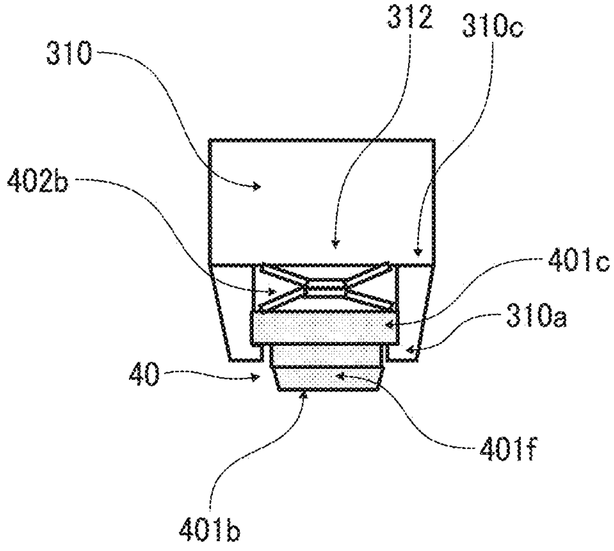
FIG. 15 is a view illustrating Example 4 of the present embodiment.

In this example, another type of spring can be used. FIG. 15 is a view illustrating Example 4 of the present embodiment. Example 4 is also adopted in a case where an ink not containing any filler (a filler-less ink) is used. In the configuration according to Example 3 in FIG. 14, the core-side elastic portion 402 is the coil spring 402$a$. This example differs from the configuration according to Example 3 in that a spring 402$b$ (an example of the second elastic portion) that is a disc spring is used instead of a coil spring. The other components in this example are similar to those in Example 3.

In this example, a disc spring is used as the spring 402$b$ as described above. In this manner, various spring characteristics can be obtained by combining disc springs, and this example can be developed to forms for various kinds of use, such as a configuration that can change the spring height as a whole, for example.

In this example, resin can also be used as the material of the spring 402$b$. In that case, a disc spring can easily form a harder spring than a coil spring as in this example.

Example 5

Figure 16:
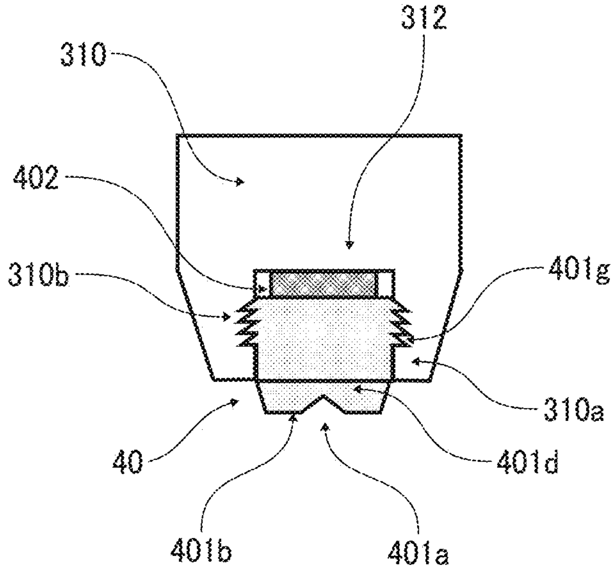
FIG. 16 is a view illustrating Example 5 of the present embodiment.

FIG. 16 is a view illustrating Example 5 of the present embodiment. Example 5 is also adopted in a case where an ink not containing any filler (a filler-less ink) is used.

This example differs from Example 1 in that the core 310 has a hook-like holding portion 310$a$ that is an undercut. Further, in the core 310, a triangular (jagged) holding portion 310$b$ (an example of the holding member) is formed in the vicinity of the center portion in the axial direction of the recess 312 at which the elastic member 40 is located. Along with this, a discharge-side elastic portion 401$d$ (an example of the first elastic portion) has a holding portion 401$g$ formed with triangular irregularities or jagged surface. The other components in this example are similar to those in Example 1.

The core (310) has a jagged surface on an inner surface of the recess to hold the elastic member (40) in the recess (312). The triangular (jagged) holding portion 401$g$ acts with a weak resistance when the elastic member 40 is pushed into the recess 312 (the back side of the core 310), and conversely, acts as a strong resistance against external force when the elastic member 40 is pulled out toward the discharge side (the side of the nozzle 14).

As for the method for assembling the configuration according to this example, the discharge-side elastic portion 401$d$ is pressed-fitted from the opening at the tip, while the core-side elastic portion 402 is disposed beforehand in the recess 312. By this press fitting, the elastic member 40 expands in the radial direction, and fills the holding portion 401$g$. Accordingly, with the configuration of an integrated core, for example, it is possible to form an assembly in which a preload is applied to the discharge-side elastic portion 401$d$ and the core-side elastic portion 402. As the assembling can be performed by simple press fitting, the configuration of this example excels in assembling properties.

Other Features in the Present Embodiment

Next, the feature 2 according to the present embodiment (a configuration to be adopted in a case where an ink containing a filler formed with hard particles is used) is described. Before that description, configurations to be compared (Comparative Examples 1 and 2) are described, and the problems thereof are explained.

Comparative Example 1

Figure 17A:
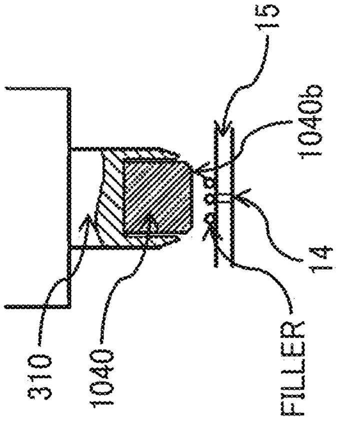
FIGS. 17A to 17D are views for explaining a problem in the configuration according to Comparative Example 1.

Referring back to FIG. 5, a problem in a case where a filler-containing ink is used in the configuration according to Comparative Example 1 is described. In the configuration according to Comparative Example 1, the elastic member 1040 is formed with a fluororesin as described above. A filler is interposed at the tip of the fluororesin elastic member 1040. FIGS. 17A to 17D are views illustrating a state in which the fluororesin on-off valve in the configuration according to Comparative Example 1 is subjected to indentation by the filler, and the ink is coming out (leaking). The sequence is from FIG. 17A to FIG. 17D. Since the configurations in FIGS. 17A to 17D are basically the same, reference signs are illustrated in FIG. 17A, but are not illustrated in the others.

Figure 17B:
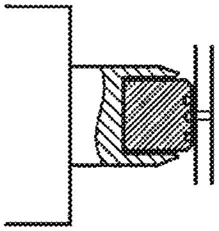
Figure 17C:
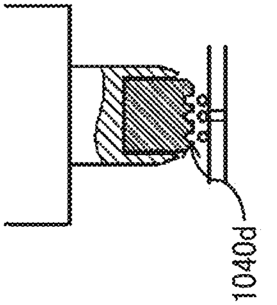
Figure 17D:
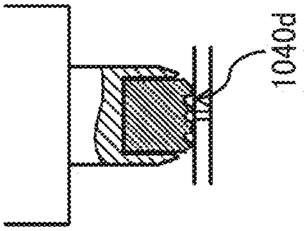

From FIG. 17A to FIG. 17B, the tip of the elastic member 1040 comes into contact with the nozzle plate 15. As can be seen from FIG. 17C, a large number of minute recesses 1040*d* are formed at the tip of the elastic member 1040 by the indentation by the filler. Therefore, in FIG. 17D, the tip of the elastic member 1040 again comes into contact with the nozzle plate 15, but the aggregate of the minute recesses 1040*d* forms a gap between the tip and the nozzle plate 15, which causes liquid leakage. The configuration according to Comparative Example 1 has been explained not only in this case but also in the description of the feature 1, and therefore, liquid leakage also occurs due to retraction of the end face of the on-off valve (the elastic member).

Comparative Example 2

Figure 18:
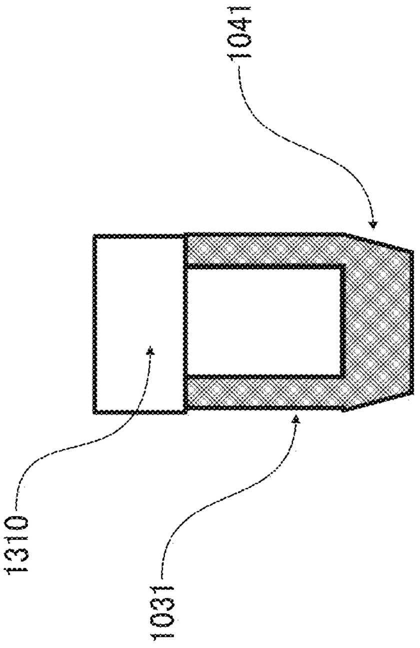
FIG. 18 is a view illustrating a configuration according to Comparative Example 2.

Next, Comparative Example 2, which is another comparative example, is described. FIG. 18 illustrates a configuration according to Comparative Example 2. As illustrated in FIG. 18, Comparative Example 2 is a configuration in which a rubber film is formed on the surface layer of a metallic core 1310 by compression molding, and is used as an on-off valve 1031. In a case where a filler-containing ink is used, an on-off valve formed with a rubber such as perfluoro-rubber is used in this manner. The rubber on-off valve 1031 is less likely to be damaged by a filler.

Figure 19A:
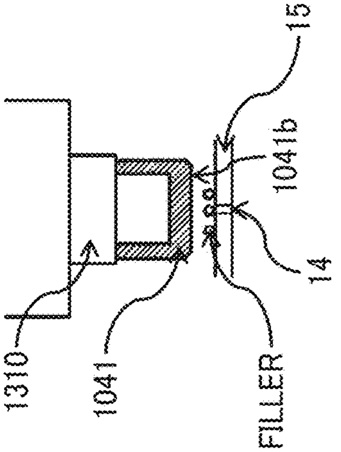
FIGS. 19A to 19E are views for explaining a problem in the configuration according to Comparative Example 2.
Figure 19B:
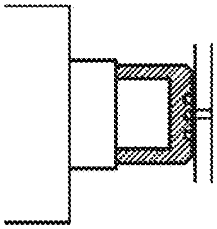
Figure 19C:
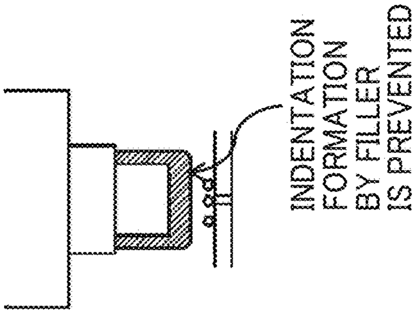
Figure 19D:
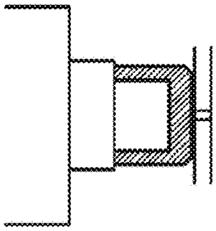

FIGS. 19A to 19E are views for explaining a problem in the configuration according to Comparative Example 2. The sequence herein is from FIG. 19A to FIG. 19D. Since the configurations in FIGS. 19A to 19D are basically the same, reference signs are illustrated in FIG. 19A, but are not illustrated in the others. In the configuration in FIG. 19A to FIG. 19E, the metallic core 1310 is molded and covered with the fluorine-based elastic member 1041. From FIG. 19A to FIG. 19B, the tip of the elastic member 1041 comes into contact with the nozzle plate 15. As can be seen from FIG. 19C, no indentation due to the filler is formed at the tip of the elastic member 1041. That is, this drawing illustrates a situation in which indentation formation by the filler is prevented. In FIG. 19D, the tip of the elastic member 1041 again comes into contact with the nozzle plate 15. However, minute recesses like those in the configuration according to Comparative Example 1 are not formed at the tip, and thus, any gap is not formed. Accordingly, liquid leakage is less likely to occur than in the configuration according to Comparative Example 1. However, such a configuration has the problem described below.

Figure 19E:
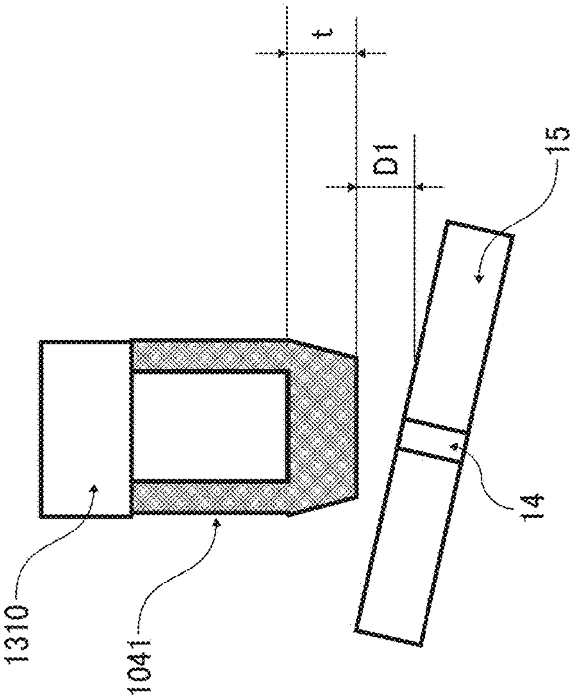

It is difficult to strictly ensure parallelism between the end face of the tip of the on-off valve (the elastic member) and the plane of the nozzle plate 15 in the assembling process. Therefore, as illustrated in FIG. 19E, the nozzle plate 15 is normally inclined with respect to the end face of the tip of the elastic member 1041.

In such a case, it is necessary to maintain a sufficient rubber thickness t for the end face so that a height change D1 caused in the nozzle plate 15 by the inclination can also be absorbed, and sealing can be performed. In that case, however, the elastic member 1041 is a rubber member, and therefore, the elastic member 1041 is not easily deformed plastically, and excels in elastic recovery. Because of this, the elastic member 1041 does not easily conform to the inclined surface of the nozzle plate 15. Therefore, there is a problem in that a long stroke is necessary to open and close the on-off valve. This problem will be described later in detail, with reference to FIGS. 21A-I to 21B-2.

Feature 2 in the Present Embodiment

The present embodiment copes with the above problem as described below. The feature 2 in the present embodiment is now described with reference to the drawings.

Example 6

Figure 20A:
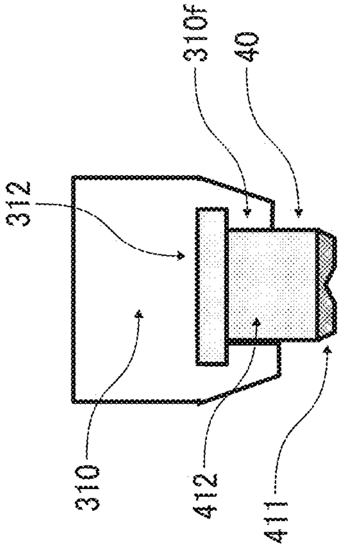
FIGS. 20A and 20B are views illustrating Example 6 of the present embodiment.
Figure 20B:
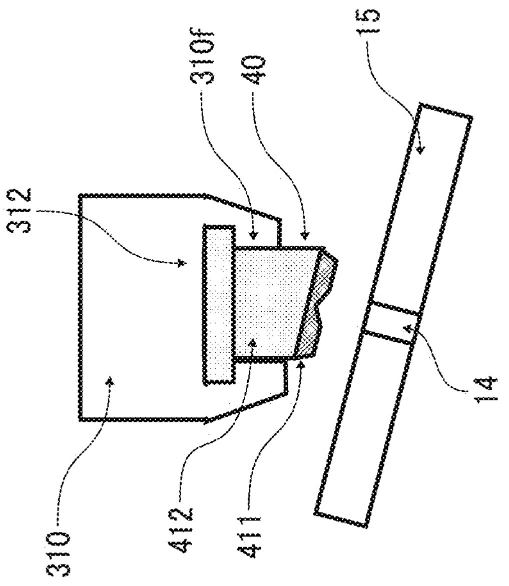

FIGS. 20A and 20B are views illustrating Example 6 of the present embodiment. Example 6 is a configuration to be adopted in a case where an ink containing a filler formed with hard particles (hereinafter referred to as a filler-containing ink) is used. This example is also the same as the examples regarding the feature 1 in being designed to reduce liquid leakage. However, the type of ink to be used is different, and therefore, the cause of liquid leakage differs from the cause of ink leakage in the examples described above. Accordingly, the configuration also differs from the configurations of the foregoing examples. This is described in detail below.

A fluororesin is known to have excellent elastoplastic properties. Accordingly, the shape of a pressure member is easily transferred. In a case where a filler-containing ink is used, a rubber member having a high yield stress needs to be disposed on the size of the nozzle 14. In view of this, this example takes advantage of the characteristics.

First, this example differs from Examples 1 to 5 described above in the elastic member 40 that has a rubber member and a resin member that are disposed opposite to each other on the discharge side and the core side, and are combined.

That is, as illustrated in FIG. 20A, this configuration includes: a discharge-side elastic portion 411 (an example of the first elastic portion) that is formed with a rubber member and is disposed on the contact face side of the nozzle plate 15; and a core-side elastic portion 412 (an example of the second elastic portion) that is formed with a resin member and is disposed in the recess 312 on the side of the core 310. The core 310 has a hook-like holding portion 310*f* (an example of the holding member), and the holding portion 310*f* is disposed at the portion (the deepest portion) closest to the core 310 in the recess 312 of the core 310.

FIG. 20B is a view illustrating a case where, at the time of assembling, the core-side elastic portion 412 is plastically deformed beforehand so as to conform to the inclination of the surface of the nozzle plate 15 with a large amount of crushing (when being moved further forward in the positive direction from the point of zero on the H axis illustrated in FIGS. 24A to 24F described later), and the gap is then again adjusted. The combined spring constant described with reference to FIG. 9 can be applied not only to the feature 1 but also to the feature 2, which is the present feature. A combination of two elastic members is harder than an elastic member formed with a rubber member. Accordingly, the elastic member 40 is plastically deformed, and this plastic deformation is taken advantage of herein. Returning back to FIGS. 20A and 20B, the description is continued. Since the tip of the discharge-side elastic portion 411 is deformed so as to be substantially parallel to the inclined nozzle plate 15, the opening and closing driving of the on-off valve can be performed with the minimum stroke, without the inclination thereof being taken into account.

Difference in Opening/Closing Amount Between the Configuration According to This Example and the Configuration According to Comparative Example 2

Figures 1, 21A:
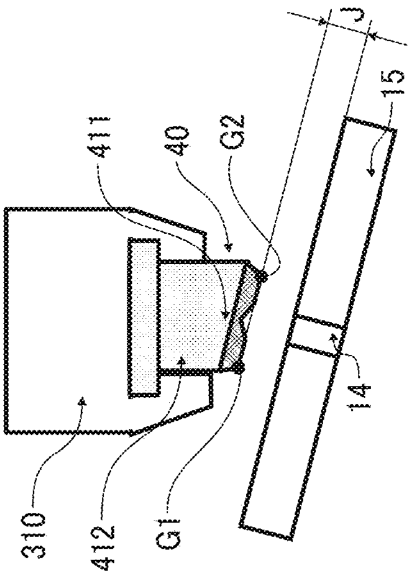
Figures 2, 21A:
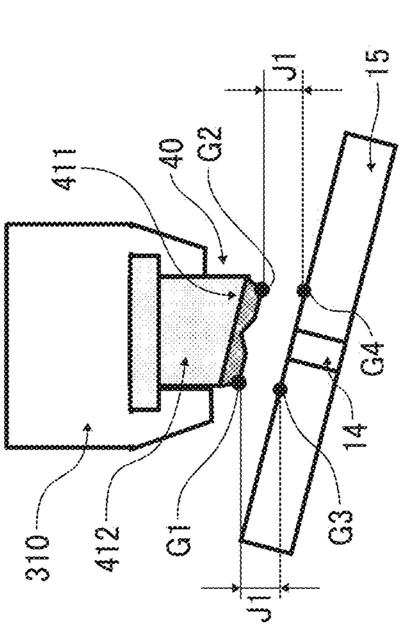
Figures 1, 21B:
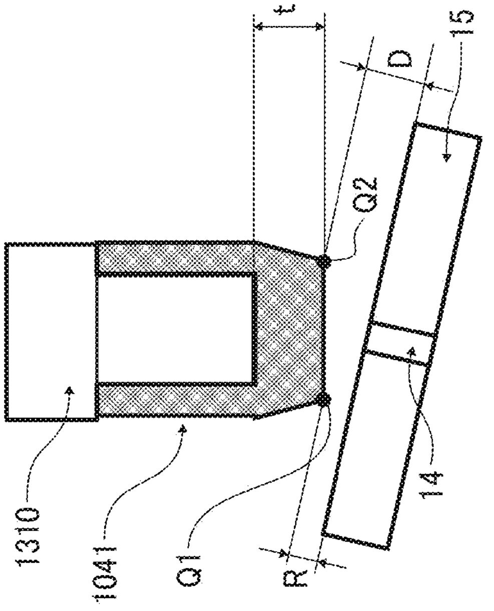
Figures 2, 21B:
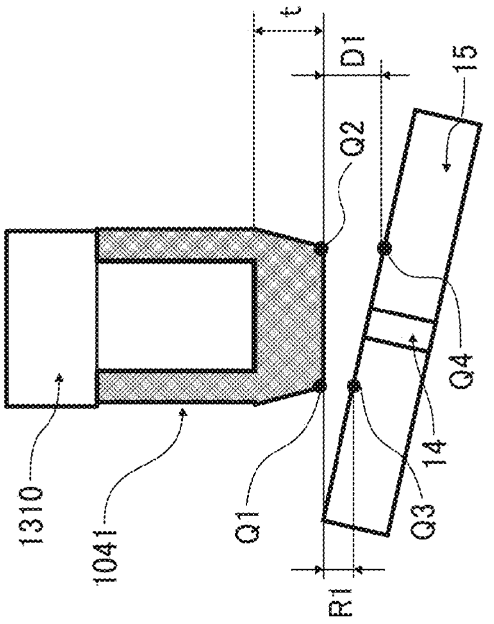

The configuration described above is adopted in this example, and the reason for that is now described with reference to FIGS. 21A-1 to 21B-2. FIGS. 21A-1 to 21B-2 are views illustrating a difference in the opening/closing amount between the configuration according to this example and the configuration according to Comparative Example 2. FIG. 21A-1 is a view for explaining a distance relationship between the elastic member and the nozzle plate in this example (Example 6). FIG. 21A-2 is a view for explaining a case where the on-off valve (the elastic member) is driven to open and close in a state where the nozzle plate is inclined in this example. On the other hand, FIG. 21B-1 is a view for explaining the distance relationship between the elastic member and the nozzle plate in the comparative example (Comparative Example 2). FIG. 21B-2 is a view for explaining a case where the on-off valve (the elastic member) is driven to open and close in a state where the nozzle plate is inclined in the comparative example.

In FIG. 21A-1, J represents the distance between the contact face of the nozzle plate 15 with the elastic member 40 in the configuration according to this example and a parallel line extending through a point G1 at the left end portion of the tip of the elastic member 40. This parallel line also extends through a point G2 at the right end portion of the tip of the elastic member 40. Accordingly, the distance between the point G2 and the contact face of the nozzle plate 15 with the elastic member 40 is equal to J. In FIG. 21A-2, J1 represents the distance between a point G3 on the contact face of the nozzle plate 15 with the elastic member 40 in the configuration according to this example and the point G1. The distance J1 is also the distance between the point G2 and a point G4 on the contact face of the nozzle plate 15 with the elastic member 40.

On the other hand, in FIG. 21B-1, R represents the distance between the contact face of the nozzle plate 15 with the elastic member 1041 and a parallel line extending through a point Q1 at the left end portion of the tip of the elastic member 1041 in the configuration according to Comparative Example 2. D represents the distance between the contact face of the nozzle plate 15 with the elastic member 1041 and a parallel line extending through a point Q2 at the right end portion of the tip of the elastic member 1041 in the configuration according to Comparative Example 2.

The magnitude relationship herein is expressed as D>R. In FIG. 21B-2, R1 represents the distance between a point Q3 on the contact face of the nozzle plate 15 with the elastic member 1041 and the point Q1 at the left end portion of the tip of the elastic member 1041 in the configuration according to Comparative Example 2. Further, D1 represents the distance between a point Q4 on the contact face of the nozzle plate 15 with the elastic member 1041 and the point Q2 at the right end portion of the tip of the on-off valve 31 in the configuration according to Comparative Example 2. The magnitude relationship herein is expressed as D1>R1. Each of the lines G1-G3, G2-G4, Q1-Q3, and Q2-Q4 is parallel to the opening/closing direction (the driving direction) of the on-off valve (the elastic member).

First, the configuration according to Comparative Example 2 (which is referred to simply as the comparative example herein) is described. In the comparative example illustrated in FIG. 21B-1, the elastic member 1041 that is a rubber member is covered with the core 1310. In the configuration according to the comparative example, the thickness t of the rubber of the elastic member may be made greater. In a case where the nozzle plate 15 is inclined in the configuration according to the comparative example, the distance to the face of the nozzle plate 15 to be in contact with the tip of the elastic member 1041 differs between the left end portion and the right end portion of the tip of the elastic member 1041, as indicated by R and D. In this case, when the on-off valve is driven, moving the on-off valve by the distance R1 as illustrated in FIG. 21B-2 is not sufficient, and it is necessary to move the on-off valve by the distance D1, which is longer than the distance R1. In such a case, the device is larger in size, and furthermore, it is necessary to drive the on-off valve by a long opening/closing distance (which is a longer stroke).

In this example, on the other hand, the core side is formed with a member that is easily plastically deformed. With this arrangement, the member is plastically deformed, and the tip of the elastic member 40 is inclined. In this case, as illustrated in FIG. 21A-1, when the nozzle plate 15 is inclined, the distances to the face of the nozzle plate 15 to be in contact with the tip of the elastic member 40 from the left end portion and the right end portion of the tip of the on-off valve 31 are both equal to J. Therefore, as illustrated in FIG. 21A-2, when the on-off valve is driven, the on-off valve is moved by the distance J1. This eliminates the need to drive the on-off valve over a long distance. For this reason, the above arrangement is adopted.

Here, the spring constants of the respective elastic portions in the configuration according to the feature 2 are reversed between the discharge side and the core side compared with the feature 1, but the same numerical values are basically set. Specifically, the spring constant of the discharge-side elastic portion 411 is set to 0.05 to 1.0 N/μm under the condition that "the diameter Φ of the elastic member is 0.5 to 1 mm, and the thickness thereof is 500 μm". On the other hand, the spring constant of the core-side elastic portion 412 is set to 1 to 2 N/μm under the condition that "the diameter (D of the elastic member is 0.5 to 1 mm, and the thickness thereof is 500 μm".

Regarding the thicknesses of the elastic portions in this example, the thickness of the core-side elastic portion 412 is greater than the thickness of the discharge-side elastic portion 411 in the magnitude relationship in terms of thickness. The configuration according to this example needs to have a function of enclosing the filler contained in the ink in the rubber layer on the surface of the discharge-side elastic portion 411 and contact-sealing the flat portion of the nozzle plate 15. Specifically, a size that is about five to ten times the filler diameter is necessary. The particle size also varies depending on the purpose of use. For example, the mean particle size is about 2 μm for vehicle coating, and the mean particle diameter is about 20 μm for battery electrodes. Therefore, with the mean particle size of the filler taken into account, the thickness of the discharge-side elastic portion 411 is set to about 100 to 300 μm, to maintain a certain degree of strength. The thickness of the core-side elastic portion 412 is about 500 to 1000 μm.

In this example, the configuration is simple, and the number of parts is small. This is advantageous for weight reduction. It is also possible to prevent liquid leakage, and provide a sealing on-off valve that can respond to a high frequency with a short stroke. Thus, heat generation, residual vibration, and the like can be reduced.

Figures 1, 22A:
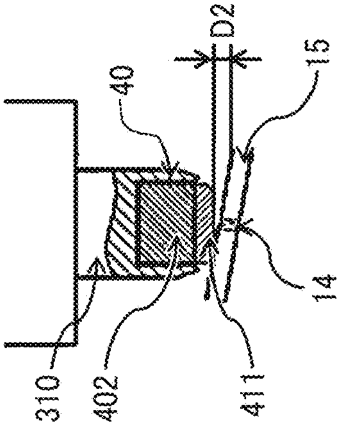
Figures 2, 22A:
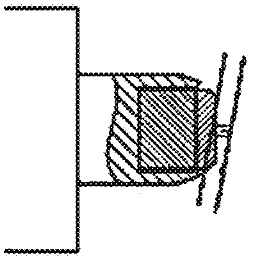
Figures 3, 22A:
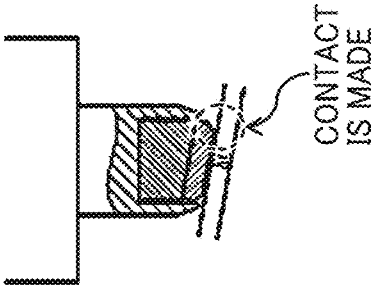
Figures 4, 22A:
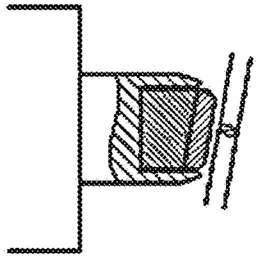
Figures 1, 22B:
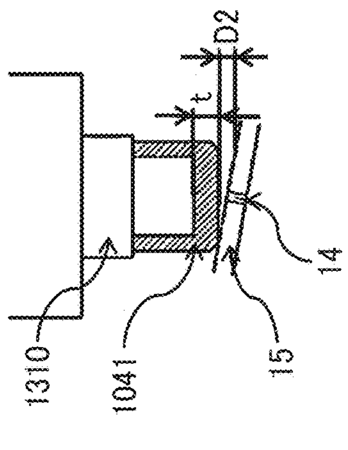
Figures 2, 22B:
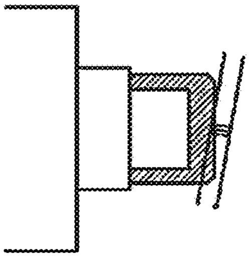
Figures 3, 22B:
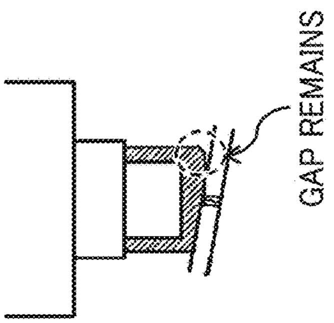
Figures 4, 22B:
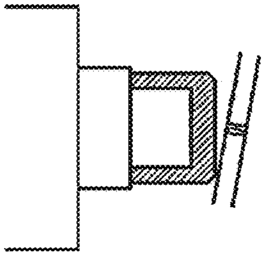

FIGS. 22A-1 to 22A-4 and FIGS. 22B-1 to 22B-4 are views illustrating a difference in the opening/closing drive operation of the on-off valve. FIGS. 22A-1 to 22A-4 illustrate the configuration according to this example, and FIGS. 22B-1 to 22B-4 illustrate the configuration according to Comparative Example 2. The sequence in the opening/closing operation is illustrated in FIGS. 22A-1 to 22A-4, and in FIGS. 22B-1 to 22B-4. Since these configurations are the same except for the opening/closing operation, reference signs are illustrated in FIG. 22A-1 and in FIG. 22B-1, but are not illustrated in other figures. In both FIGS. 22A-1 and 22B-1, D2 represents the distance between the right end portion of the elastic member and the nozzle plate. First, the configuration according to Comparative Example 2 (the configuration illustrated in FIGS. 22B-1 to 22B-4) is described.

From in FIG. 22B-1 to 22B-2, the left end portion of the elastic member 1041, which is a rubber member, comes into contact with the nozzle plate 15. As can be seen from FIG. 22B-3, the right end portion of the elastic member 1041 has a gap from the nozzle plate 15. To bring the right end portion into contact with the nozzle plate 15, it is necessary to adjust the amount of opening and closing of the on-off valve to the right end portion.

Therefore, it is necessary to make the distance D2 longer. After that, as illustrated in of FIG. 22B-4, when the elastic member 1041 and the nozzle plate 15 are separated from each other, the elastic member 1041 no longer conforms to the inclination of the nozzle plate 15. Therefore, the distances from the left end portion and the right end portion of the elastic member 1041 to the nozzle plate 15 are different. In the configuration according to Comparative Example 2, it is necessary to make the rubber thickness t greater.

However, the rubber member cannot conform to (cannot follow) the shape of the nozzle plate 15 inclined by the on-off valve formed with a metal cored bar compatible with the filler. Therefore, the gap amounts at both end portions of the tip of the elastic member 1041 are different, and it is necessary to open and close the on-off valve in accordance with the larger gap amount. Because of this, it is necessary to drive the on-off valve with a larger opening/closing amount.

On the other hand, this example is as illustrated in FIGS. 22A-1 to 22A-4. From of FIG. 22A-1 to 22A-2, the left end portion of the discharge-side elastic portion 411 comes into contact with the nozzle plate 15. As the core-side elastic portion 412 (a fluororesin in this case) on the core side (back side) of the recess 312 is provided, the discharge-side elastic portion 411 conforms to (can follow) the shape of the inclined nozzle plate 15.

Accordingly, as illustrated in of FIG. 22A-3, the right end portion of the discharge-side elastic portion 411 also comes into contact with the nozzle plate 15. After that, as can be seen from FIG. 22A-4, when the discharge-side elastic portion 411 and the nozzle plate 15 are separated from each other, the tip of the discharge-side elastic portion 411 is inclined with respect to the nozzle plate 15. That is, the gap amounts between the nozzle plate 15 and both end portions of the discharge-side elastic portion 411 become substantially the same.

Therefore, the distance D2 related to opening and closing the on-off valve is not necessarily as long as the corresponding distance in the configuration according to Comparative Example 2. In such a manner, the discharge-side elastic portion 411 (a fluoro-rubber sheet) can be made as thin as possible, and the surface of the on-off valve can be maintained with a gap parallel to the nozzle plate 15 even when the on-off valve is opened and closed.

Other Examples Related to the Feature 2

Examples related to the feature 2 of the present embodiment include Example 7, in addition to Example 6 described above.

This example is described below.

Example 7

Figure 23:
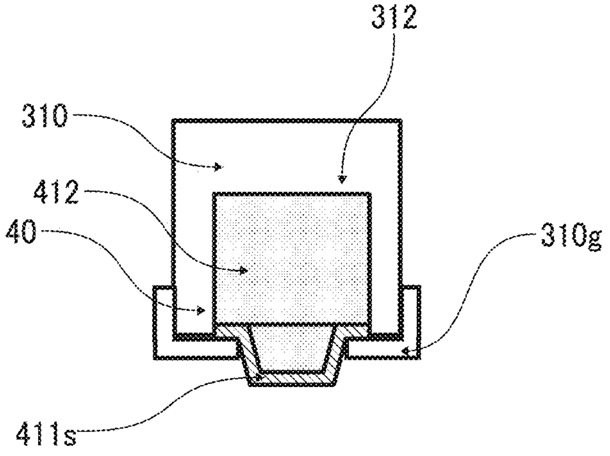
FIG. 23 is a view illustrating Example 7 of the present embodiment.

FIG. 23 is a view illustrating Example 7 of the present embodiment. Example 7 is also a configuration to be adopted in a case where a filler-containing ink is used, like Example 6. This example differs from the configuration according to Example 6 primarily in that a holding plate 310*g* is provided on the core 310. The other components in this example are similar to those in Example 6.

First, in the elastic member 40 of this example, a discharge-side elastic portion 411*s* (an example of the first elastic portion) formed with a rubber member is disposed on the contact face side with the nozzle plate 15, and the core-side elastic portion 412 formed with a resin member is disposed in the recess 312 on the side of the core 310. Here, the discharge-side elastic portion 411*s* is the hatched portion in FIG. 23, and is formed in a sheet-like shape.

In this example, the elastic member 40 includes a plurality of elastic bodies. However, in a case where a chemically stable fluororesin or fluoro-rubber is used for each elastic body of the plurality of elastic bodies, it might be difficult to bond or join elastic bodies at an elastic body interface. Therefore, the holding plate 310*g* is provided on the core 310. The holding plate 310*g* is used to secure the elastic member 40 to the core 310, and accordingly, assembling can be performed while a compression preload is applied. Thus, breakage can be prevented even in a case where the adhesive force at the elastic body interface is weak. For the material of the holding plate 310*g*, a material such as metal or resin can be used. As for the method for securing the holding plate 310*g* to the core 310, it is possible to use a method suitable for the material of the holding plate 310*g*, such as adhesion, fastening with a screw, caulking, pressure bonding, or heat welding. For example, in a case where the material of the holding plate 310*g* is a heat-shrinkable fluororesin, the holding plate 310*g* is disposed so as to cover the periphery of the core 310, and is then heated. In this manner, the holding plate 310*g* is pressure-bonded to the core 310 by thermal contraction of the holding plate 310*g*. As a result, the holding plate 310*g* is secured to the core 310, without use of an adhesive or a screw.

Here, this example has advantages as described below. For example, in the configuration according to Example 6, it is necessary to mold or machine a component having a shape in which a V-shaped cut is formed in the end face of the tip of the discharge-side elastic portion 411 on the side of the nozzle 14. Therefore, to form the elastic member 40, adhesion or the like is eventually performed between the discharge-side elastic portion 411 and the core-side elastic portion 412. Meanwhile, it is normally difficult to bond a fluorine-based rubber member and a resin member, and some special bonding means might be used depending on the types of the members.

In this example (Example 7), on the other hand, the discharge-side elastic portion 411*s* can be manufactured from a general-purpose sheet material. Further, the discharge-side elastic portion 411*s* is formed in a sheet-like shape and is held and secured by the holding plate 310*g*. Therefore, adhesion or the like between the discharge-side elastic portion 411*s* and the core-side elastic portion 412 is unnecessary. When the elastic layer of the core-side elastic portion 412 deteriorates, the elastic layer is simply replaced with a new one, so that the core-side elastic portion 412 can be prepared for use.

Relationship Between the Position (Displacement) of the On-Off Valve and the Ink Discharge Amount FIGS. 24A to 24F are a graph and views illustrating the relationship between the position (displacement) of the on-off valve and the ink discharge amount. First, the operator of the driver (the piezoelectric element) of the on-off valve moves the driver of the on-off valve (brings the driver into contact with the nozzle plate) gradually from a state in which the on-off valve (the elastic member) discharges ink in a non-contact manner, and searches for the displacement position at which the ink flow rate reaches the zero point. With the initial sealing position being the zero point on the H axis, the driver of the on-off valve is further moved forward within the elastic range of the on-off valve (the elastic member). As for a temperature change, the driver of the on-off valve is moved to a position at which ink leakage does not occur even when a piezoelectric stroke varies, and is secured to the head housing with a setscrew. To positively activate the shape conformation as in this example, the driver of the on-off valve is moved forward from the zero point on the H axis to a point beyond the elastic limit, and the flow-rate zero point is newly searched for after the fluororesin portion is plastically deformed once. In this manner, the function of this example can be efficiently achieved.

Figures 24A, 24B, 24C, 24D, 24E, 24F:
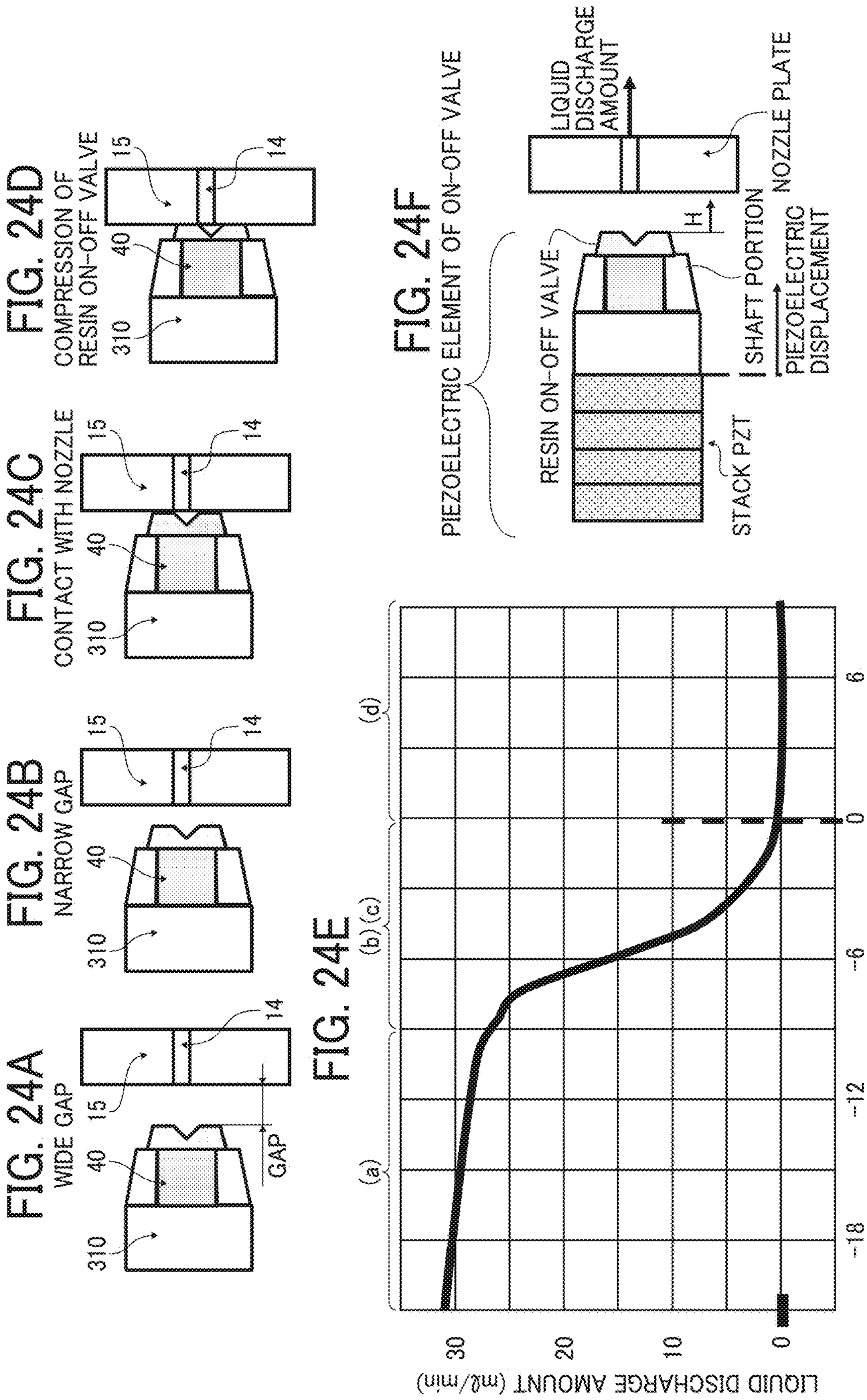
FIGS. 24A to 24F are views and a graph illustrating the relationship between the position (displacement) of the on-off valve and the ink discharge amount.

The working method is now described more specifically. In FIG. 24E, (a) to (d) indicate the respective discharge amounts in cases where the elastic member 40 is disposed at the respective positions illustrated in FIGS. 24A to 24D. Further, as illustrated in FIG. 24F, the displacement H of the tip of the elastic member 40 is positive in the direction of arrow in FIG. 24E, and is negative in the direction opposite to the arrow. That is, the direction in which the distance between the elastic member 40 and the nozzle plate 15 decreases is the positive direction, and the direction in which the distance between the elastic member 40 and the nozzle plate 15 increases is the negative direction. Here, in the state illustrated in FIG. 24A, the tip portion of the elastic member 40 is at the position farthest from the nozzle 14. At this point of time, the ink discharge amount is maximized. As illustrated in FIG. 24B, the ink discharge amount decreases as the tip portion of the elastic member 40 approaches the nozzle 14. Further, when the tip portion of the elastic member 40 approaches the nozzle 14, and the elastic member 40 comes into contact with the nozzle plate 15 as illustrated in FIG. 24C, the ink discharge amount becomes almost zero. In this state, however, the nozzle 14 is not completely sealed. To completely seal the nozzle 14, it is necessary to press the tip portion of the elastic member 40 against the nozzle plate 15, and compress the elastic member 40, as illustrated in FIG. 24D. However, when the elastic member 40 retreats into the recess 312 as described above after the tip portion of the elastic member 40 is pressed against the nozzle plate 15, a sufficient amount of compression of the elastic member 40 is not ensured, and therefore, the nozzle 14 is not sealed. In view of this, it is necessary to shift the reference position (the initial position) of the on-off valve in the forward direction by the distance by which the elastic member 40 is to retreat, so as to ensure a sufficient amount of compression of the elastic member 40.

On the other hand, when the reference position of the on-off valve is shifted in the forward direction, a change is caused in the position of the on-off valve in a state where the nozzle 14 is open, because the amount of expansion and contraction of the piezoelectric element is constant (about 20 to 30 μm, for example). In a state where the nozzle 14 is open, to obtain a predetermined ink discharge amount, it is necessary to ensure a sufficiently wide gap (5 μm or wider, for example) between the elastic member 40 and the nozzle 14. Therefore, in the position adjustment for the on-off valve, it is necessary to perform control to ensure a sufficiently wide gap between the elastic member 40 and the nozzle 14 for a time of opening the nozzle 14, and ensure a sufficient amount of compression of the elastic member 40 for a time of closing the nozzle 14. It is difficult to achieve both a correct position of the on-off valve for a time of opening the nozzle 14 and a correct position of the on-off valve for a time of closing the nozzle 14, and great amounts of effort and time are used for the adjustment work. Therefore, the above examples of the present embodiment aim to eliminate the problems due to degradation of the elastic function of the elastic member and changes in the position of the end portion of the elastic body, to facilitate the position adjustment work for the on-off valve.

Evaluation of the End Face of an On-Off Valve

Figure 25A:
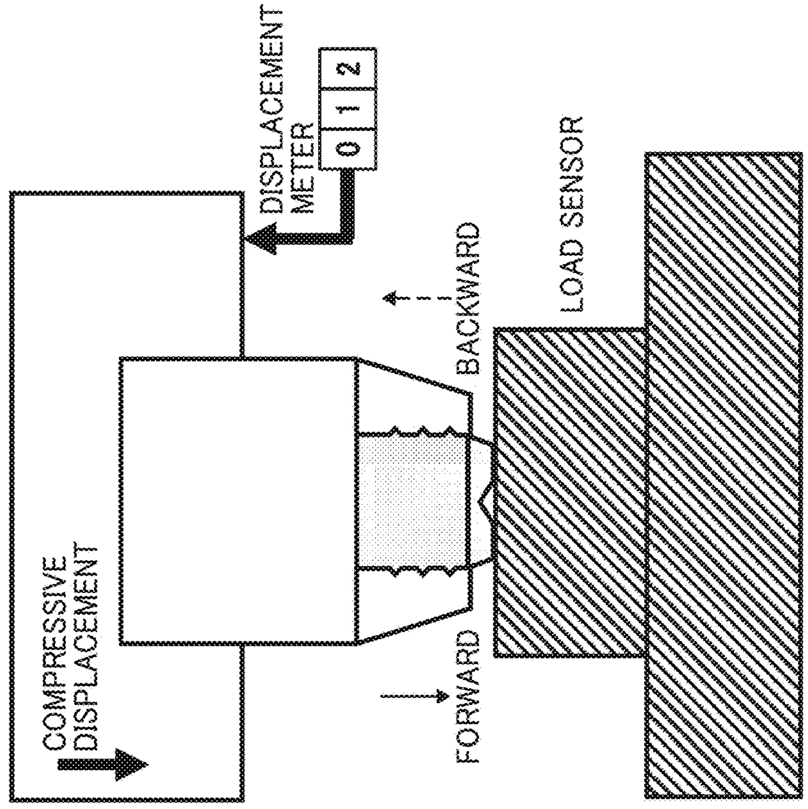
FIGS. 25A and 25B are a view and a graph illustrating the function evaluation prior to shipment.
Figure 25B:
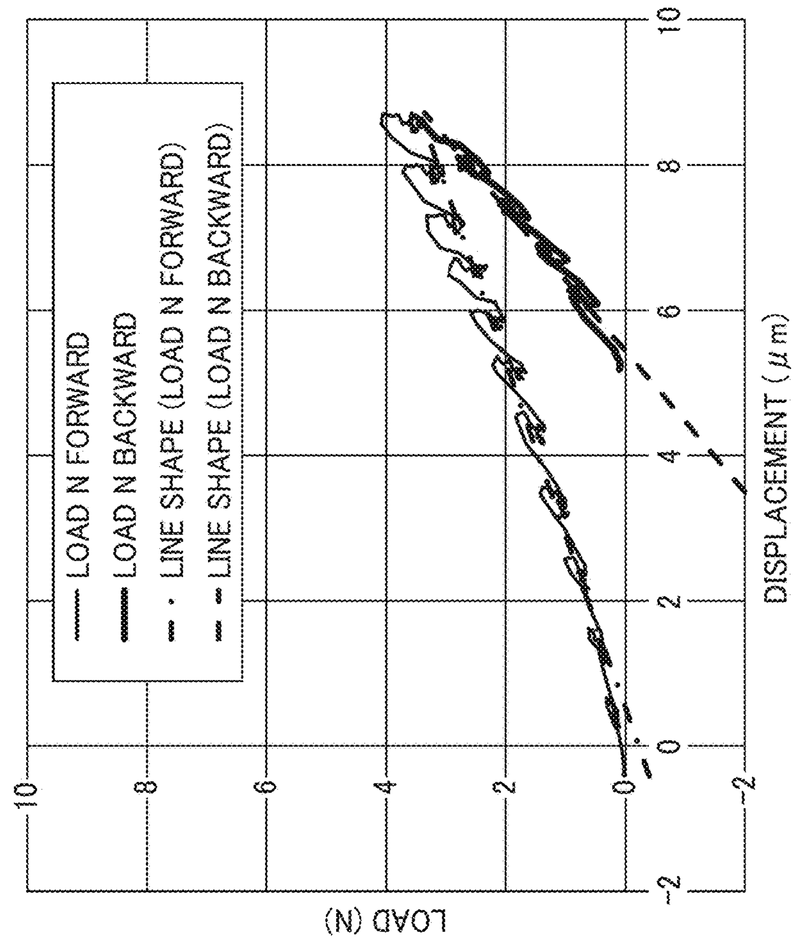

FIGS. 25A and 25B are a view and a graph illustrating functional evaluation prior to shipment. The device illustrated in FIG. 25A is an evaluation machine that checks whether retraction of the end face of an elastic member is observed, as the functional evaluation prior to shipment. Specifically, a needle-like on-off valve is pushed into (forward) and pulled back (backward) from a force sensor by 1 μm at a time, the needle displacement to load during that process is measured, and the relationship is plotted on a chart for evaluation. When retraction of the end face of the elastic member occurs, different paths are followed in the outward path (forward) and the return path (backward) of compression, and the difference in the horizontal axis position at the zero load point is the plastic strain amount. Further, as caulking is performed, the hysteresis that is the difference between the outward path and the return path increases, and the elastic modulus (a primary coefficient) decreases. The elastic modulus of a resin is about 1 N/μm. The waveform in FIG. 25B is similar to the waveform by a nanoindentation evaluation method (ISO 14577), and it has been confirmed that plastic deformation similar to deformation caused by insertion of an indenter has occurred. Here, the curve in the graph in FIG. 25B has an irregular shape as if to draw an ellipse. The reason for this is that the elastic characteristics of a rubber member have temporal responsiveness, and the generated force is not fixed to one force when compressive displacement is caused.

Configuration of an Embodiment of a Liquid Discharge Apparatus

Next, the configuration of an embodiment of a liquid discharge apparatus is described with reference to the drawings.

Figure 26A:
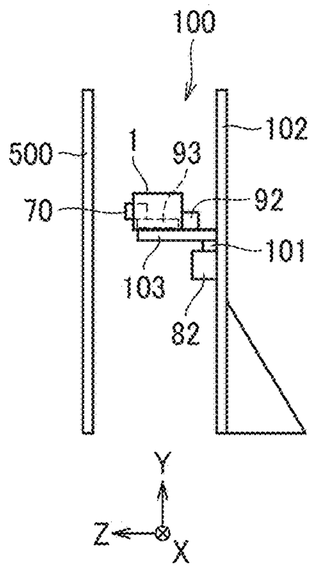
FIGS. 26A and 26B are schematic configuration diagrams of an entire liquid discharge apparatus.
Figure 26B:
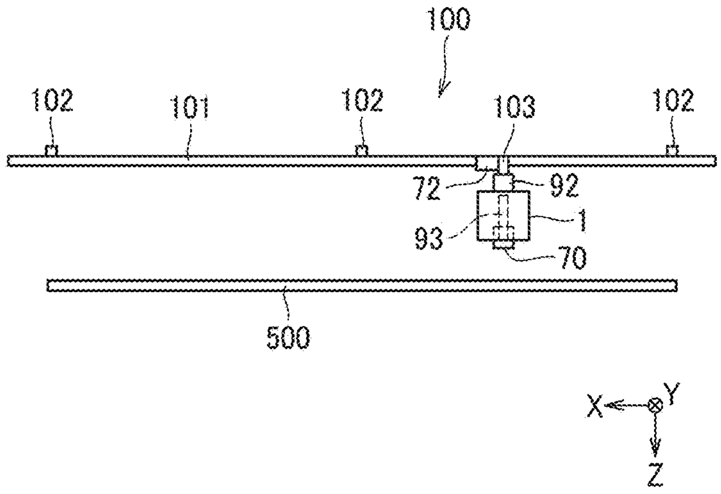

FIGS. 26A and 26B are schematic configuration diagrams of an entire liquid discharge apparatus 100 (an example of a liquid discharge apparatus). FIG. 26A is a side view of the liquid discharge apparatus, and FIG. 26B is a plan view of the liquid discharge apparatus. The liquid discharge apparatus 100 is disposed facing a liquid application target 500, which is an example of the object. The liquid discharge apparatus 100 includes an X-axis rail 101, a Y-axis rail 102, and a Z-axis rail 103. The Y-axis rail 102 intersects the X-axis rail 101, and the Z-axis rail 103 intersects the X-axis rail 101 and the Y-axis rail 102. In particular, in the present embodiment, the X-axis rail 101, the Y-axis rail 102, and the Z-axis rail 103 extend in directions orthogonal to one another.

The Y-axis rail 102 holds the X-axis rail 101 so that the X-axis rail 101 is movable in the Y-axis direction. The X-axis rail 101 holds the Z-axis rail 103 so that the Z-axis rail 103 is movable in the X-axis direction. The Z-axis rail 103 holds a carriage 1 (an example of a support unit) so that the carriage 1 is movable in the Z-axis direction.

The liquid discharge apparatus 100 includes a first Z-direction driver 92 and an X-direction driver 72. The first Z-direction driver 92 moves the carriage 1 in the Z-axis direction along the Z-axis rail 103. The X-direction driver 72 moves the Z-axis rail 103 in the X-axis direction along the X-axis rail 101. The liquid discharge apparatus 100 also includes a Y-direction driver 82 that moves the X-axis rail 101 in the Y-axis direction along the Y-axis rail 102. The liquid discharge apparatus 100 further includes a second Z-direction driver 93 that moves a head holder 70 in the Z-axis direction with respect to the carriage 1.

The liquid discharge head described above is fitted to the head holder 70 so that the nozzles 14 (see FIG. 2) of the liquid discharge head 10 face the liquid application target 500 The liquid discharge apparatus 100 designed as described above discharges ink, which is an example of a liquid, from the liquid discharge head fitted to the head holder 70 toward the liquid application target 500 while moving the carriage 1 in the X-axis. Y-axis, and Z-axis directions, and performs drawing on the liquid application target 500.

Next, the configuration of an inkjet printer 201 that is another embodiment of a liquid discharge apparatus is described with reference to the drawings.

Figure 27:
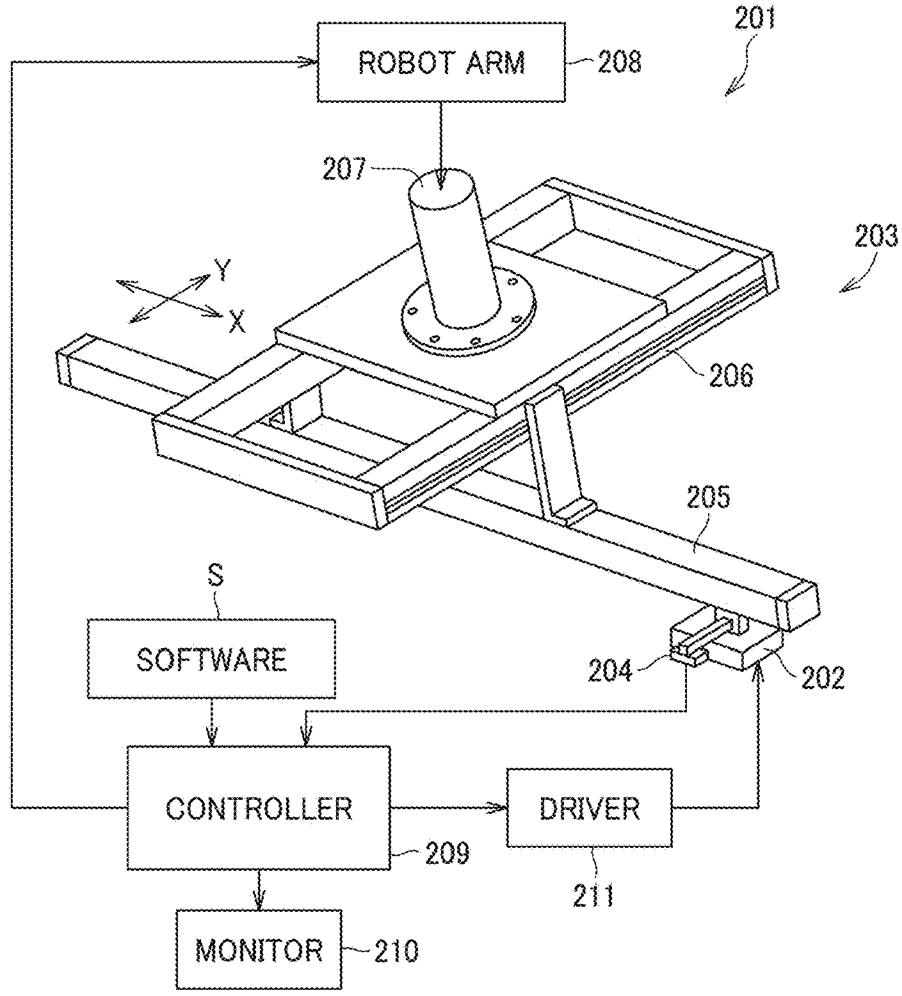
FIG. 27 is a schematic configuration diagram of another example of an entire liquid discharge apparatus.

As illustrated in FIG. 27, the inkjet printer 201 according to the present embodiment includes a print head 202, an X-Y table 203, a camera 204, a controller 209, and a driver 211.

The print head 202 is an inkjet liquid discharge head that discharges ink (liquid) toward the coating target surface of a coating target M. The term "ink" used herein also includes "paint". The print head 202 includes a plurality of valve-type nozzles, and ink is discharged from each valve-type nozzle in a direction perpendicular to the discharge face of the print head 202. That is, the ink discharge face of the print head 202 is parallel to the X-Y plane formed by movement of the X-Y table 203, and the ink dots discharged from each valve-type nozzle are discharged in a direction perpendicular to the X-Y plane. Further, the discharging directions of the ink to be discharged from the respective valve-type nozzles are parallel to one another. Each valve-type nozzle is joined to an ink tank for a predetermined color. Further, as the ink tanks are pressurized by a pressurizing device, if the distance between each valve-type nozzle and the print target surface of the coating target M is about 20 cm, the ink dots can be discharged from each valve-type nozzle onto the print target surface without any problem.

Figure 28:
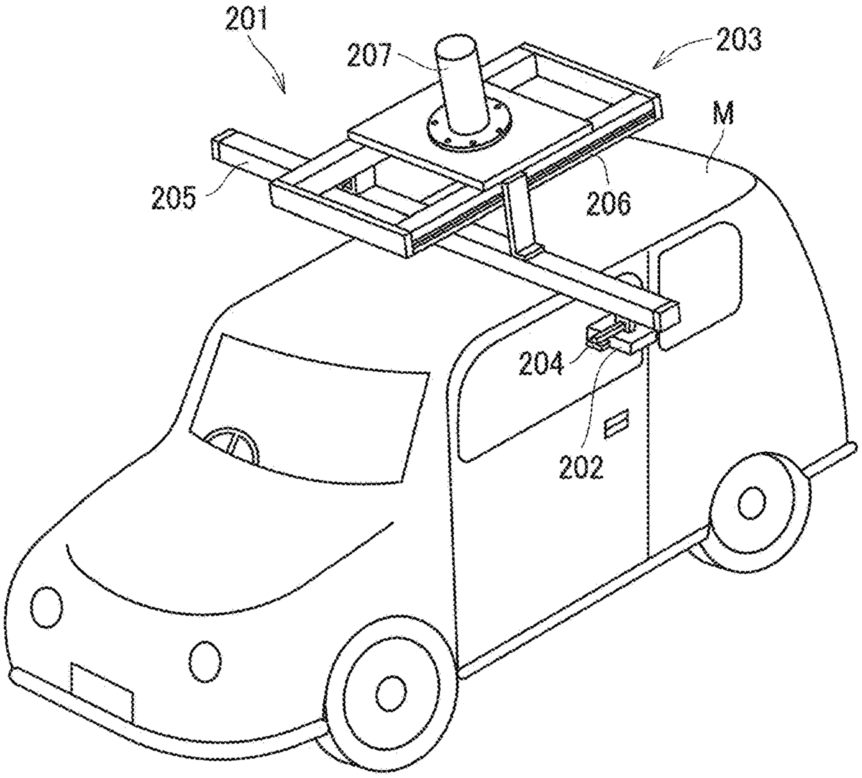
FIG. 28 is a perspective view illustrating an example of placement of a liquid discharge apparatus on an automobile.
Figure 29:
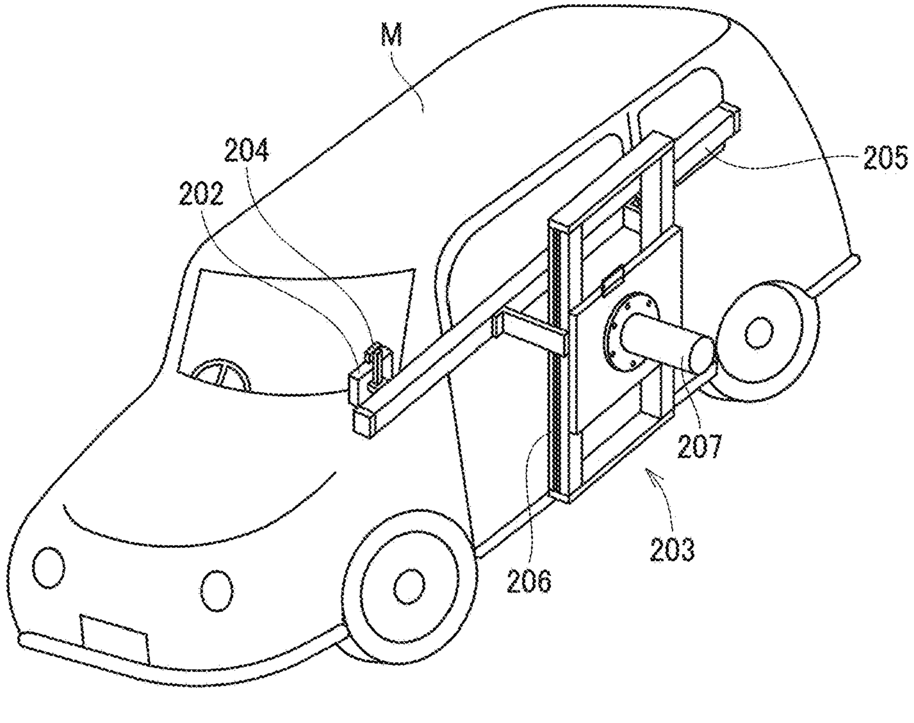
FIG. 29 is a perspective view illustrating another example of placement of a liquid discharge apparatus on an automobile.

The X-Y table 203 has mechanisms that move the print head 202 and the camera 204 in the X direction and the Y direction, which are orthogonal to each other. Specifically, the X-Y table 203 has an X-axis moving mechanism 205 that moves a slider holding the print head 202 and the camera 204 described later in the X direction, and a Y-axis moving mechanism 206 that moves the X-axis moving mechanism 205 in the Y direction while holding the X-axis moving mechanism with two arms. The Y-axis moving mechanism 206 has a shaft 207, and a robot arm 208 holds and drives the shaft 207, so that the print head 202 can be placed at a predetermined position where printing is to be performed on the coating target M. For example, in a case where the coating target M is an automobile, the robot arm 208 can place the print head 202 on an upper portion of the automobile as illustrated in FIG. 28, or at a side position of the automobile as illustrated in FIG. 29. The operation of the robot arm 208 is controlled on the basis of a program stored beforehand in the controller 209.

The camera 204 is an imaging unit such as a digital camera that images the print target surface of the coating target M. The camera 204 performs imaging of a predetermined region on the print target surface of the coating target M at constant short intervals while being moved in the X direction and the Y direction by the X-axis moving mechanism 205 and the Y-axis moving mechanism 206. The specifications such as the lens and the resolution of the camera 204 are selected appropriately so that a plurality of subdivided images of the predetermined region on the print target surface can be obtained. The imaging of the plurality of subdivided images of the print target surface by the camera 204 is continuously and automatically conducted by the controller 209 described later.

The controller 209 operates the X-Y table 203 on the basis of image editing software S for editing images taken by the camera 204 and a preset control program, to control a print operation (an ink discharge operation) of the print head 202. The controller 209 is formed with a microcomputer, and includes: a storage device that records and stores various programs, data of taken images, data of images to be printed, and the like; a central processing unit that performs various processes according to the programs; input devices such as a keyboard and a mouse; and, if necessary, a DVD player. The controller 209 further includes a monitor 210. The monitor 210 displays information to be input to the controller 209, a result of processing performed by the controller 209, and the like.

The controller 209 uses image processing software to perform image processing on a plurality of pieces of subdivided image data taken by the camera 204, and generates a combined print surface that is a flat surface on which a print target surface that is not the flat surface of the coating target M is projected. The controller 209 also superimposes, on the combined print surface, a drawing target image to be printed so as to be continuous with the image already printed on the print target surface, and performs editing so that the drawing target image becomes continuous with the edge portions of the printed image. Thus, a drawing target edited image is generated. For example, as for a print image 252*b* that is a drawing target image illustrated in FIG. 30C, the print image 252*b* is edited to match the combined print surface so that a non-print region 253 is not formed between the print image 252*b* and an adjacent print image 252*a*. Thus, a drawing target edited image is generated. Ink is then discharged from the print head 202 onto the print target surface on the basis of the generated drawing target edited image. Thus, a new image is printed without any gap formed between the new image and an already printed image. The operation of taking the plurality of subdivided images with the camera 204, and the operation of printing by discharge of ink from each nozzle of the print head 202 are conducted by the driver 211 under the operation control of the controller 209.

Figure 30A:
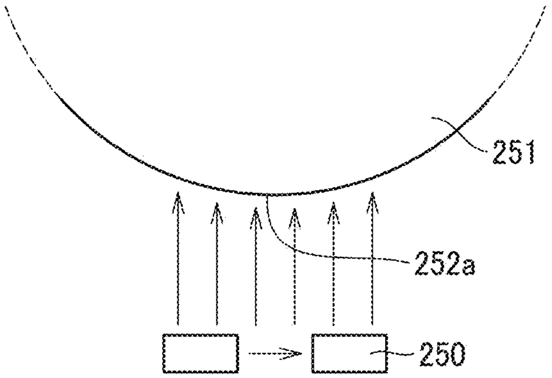
FIGS. 30A to 30C are diagrams for explaining a case where liquid is discharged onto a spherical surface by a liquid discharge apparatus.
Figure 30B:
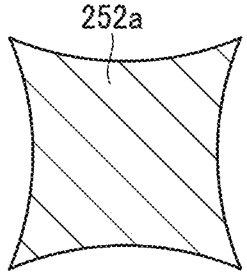
Figure 30C:
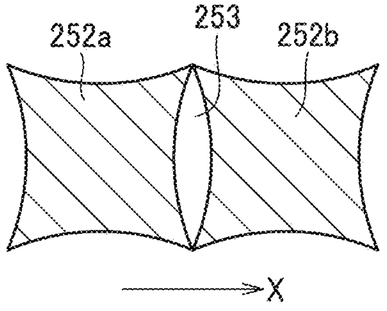

FIG. 30A illustrates the discharging direction of ink that is discharged from each inkjet nozzle mounted on a nozzle head 250 in a case where a two-dimensional quadrangle is formed by an inkjet nozzle on the spherical surface of a liquid application target 251 that is a spherical object. In FIG. 30B, the ink to be discharged from each inkjet nozzle mounted on the nozzle head 250 is discharged in a direction perpendicular to the nozzle head 250. Therefore, the print image 252*a* printed on the surface of the liquid application target 251 has a quadrangular shape in which the periphery is distorted, as illustrated in FIG. 30B.

Electrode Manufacturing Apparatus

Figure 31:
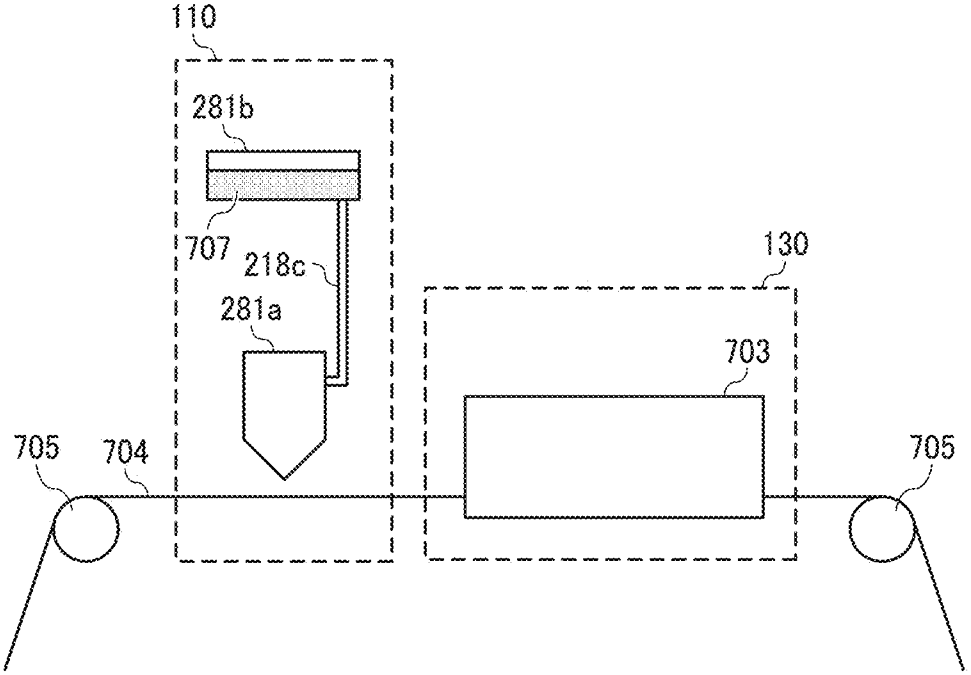
FIG. 31 is a schematic diagram illustrating an example of an electrode manufacturing apparatus for implementing an electrode manufacturing method according to an embodiment.

Examples of the present embodiment include an apparatus for manufacturing electrodes and electrochemical elements. An electrode manufacturing apparatus is described below. FIG. 31 is a schematic diagram illustrating an example of an electrode manufacturing apparatus according to this example. The electrode manufacturing apparatus is an apparatus that discharges a liquid composition using the above-described liquid discharge apparatus, to manufacture an electrode having a layer containing an electrode material.

Means for Forming a Layer Containing an Electrode Material, and a Process of Forming a Layer Containing an Electrode Material A discharging unit in this example is the liquid discharge apparatus described above. By the discharge, a liquid composition can be applied onto the object, to form a liquid composition layer. The object (hereinafter also referred to as the "discharge target object") is not limited to any particular object, as long as a layer containing an electrode material can be formed on the object. The object can be appropriately selected in accordance with the purpose of use, and examples thereof include an electrode substrate (a current collector), an active material layer, and a layer containing a solid electrode material. Further, the discharging unit and the discharging process may be designed to directly discharge a liquid composition to form a layer containing an electrode material, or may be designed to indirectly discharge a liquid composition to form a layer containing an electrode material, as long as a layer containing an electrode material can be formed on the discharge target object.

Other Components and Other Processes

Other components in an apparatus for manufacturing an electrode mixture layer are not limited to any particular components, as long as the effects of the present embodiment are not impaired. Such other components can be selected as appropriate in accordance with the purpose of use, and examples thereof include a heating unit. Other processes in a method for manufacturing an electrode mixture layer are not limited to any particular processes, as long as the effects of the present embodiment are not impaired. Such other processes can be selected as appropriate in accordance with the purpose of use, and examples thereof include a heating process.

Heating unit and Heating Process

The heating unit heats a liquid composition that is discharged by the discharging unit. The heating process is a process of heating the liquid composition discharged in the discharging process. The liquid composition layer can be dried by the heating.

Configuration for Forming a Layer Containing an Electrode Material by Directly Discharging a Liquid Composition As an example of the electrode manufacturing apparatus, an electrode manufacturing apparatus for forming an electrode mixture layer containing an active material on an electrode substrate (a current collector) is now described. The electrode manufacturing apparatus includes a discharging process unit 110 and a heating process unit 130. The discharging process unit 110 performs a process of applying a liquid composition onto a print base material 704 having a discharge target object thereon, to form a liquid composition layer. The heating process unit 130 performs a process of heating the liquid composition layer, to obtain an electrode mixture layer.

The electrode manufacturing apparatus also includes a conveyance unit 705 that conveys the print base material 704. The conveyance unit 705 conveys the print base material 704 at a preset speed in order of the discharging process unit 110 and the heating process unit 130. A method for manufacturing the print base material 704 having the discharge target object such as the active material layer is not limited to any particular method, and any known method can be selected as appropriate. The discharging process unit 110 includes a printing device 281*a* of this example that performs a process of applying a liquid composition onto the print base material 704, a storage container 281*b* that stores the liquid composition, and a supply tube 281*c* that supplies the liquid composition stored in the storage container 281*b* to the printing device 281*a*.

The storage container 281*b* stores a liquid composition 707 therein, and the discharging process unit 110 discharges the liquid composition 707 from the printing device 281*a*, to apply the liquid composition 707 onto the print base material 704 and form a liquid composition layer in the form of a thin film. The storage container 281*b* may be integrated with the apparatus for manufacturing the electrode mixture layer, or may be detachable from the apparatus for manufacturing the electrode mixture layer. Alternatively, the storage container 281*b* may be a container that is to be added to a storage container integrated with the apparatus for manufacturing the electrode mixture layer or to a storage container detachable from the apparatus for manufacturing the electrode mixture layer.

The storage container 281*b* and the supply tube 281*c* can be selected as appropriate, as long as the liquid composition 707 can be stably stored and is stably supplied.

As illustrated in FIG. 31, the heating process unit 130 includes a heater 703, and includes a solvent removal process of heating and drying the solvent remaining in the liquid composition layer with the heater 703, to remove the solvent.

Thus, the electrode mixture layer can be formed. The heating process unit 130 may perform the solvent removal process under reduced pressure.

The heater 703 is not limited to any particular kind, but can be selected as appropriate in accordance with the purpose of use. Examples thereof include a substrate heater, an IR heater, and a warm air heater, and these heaters may be combined. Also, the heating temperature and time can be selected as appropriate in accordance with the boiling point of the solvent contained in the liquid composition 707 and the thickness of the film to be formed.

Figure 32:
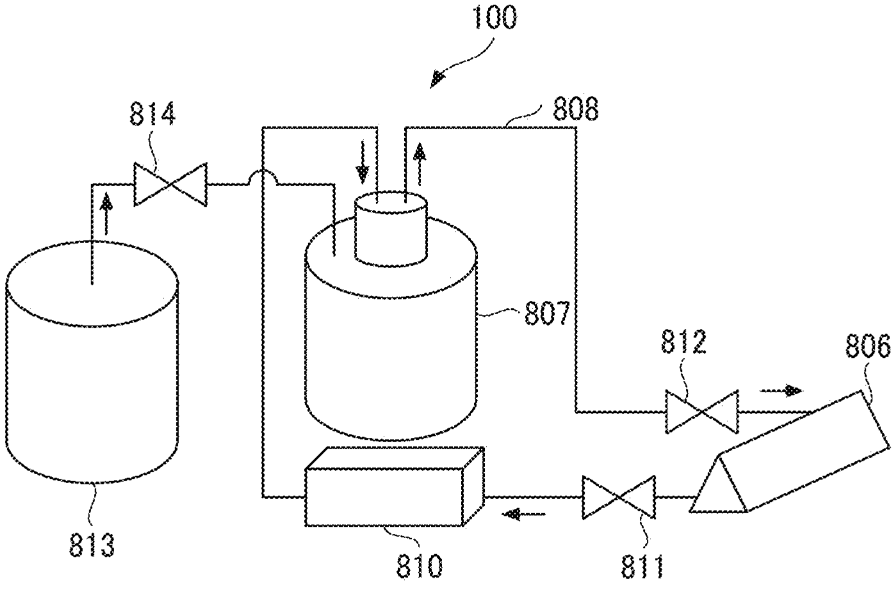
FIG. 32 is a schematic diagram illustrating another example of an electrode manufacturing apparatus for implementing an electrode mixture layer manufacturing method according to an embodiment.

FIG. 32 is a schematic diagram illustrating another example of an electrode manufacturing apparatus (a liquid discharge apparatus) according to this example. A liquid discharge apparatus 100 controls a pump 810 and control valves 811 and 812, so that a liquid composition can circulate through a discharge head 1, a tank 807, and a tube 808. The liquid discharge apparatus 100 also has an external tank 813. When the liquid composition in the tank 807 decreases, the liquid discharge apparatus 100 controls the pump 810 and control valves 811, 812, and 814, so that the liquid composition can be supplied from the external tank 813 to the tank 807. As the electrode manufacturing apparatus according to this example is used, the liquid composition can be discharged onto an intended spot on the discharge target object. The electrode mixture layer can be suitably used as a part of the configuration of an electrochemical element. The components other than the electrode mixture layer in the electrochemical element are not limited to any particular components, but any known components can be selected as appropriate. Examples thereof include a positive electrode, a negative electrode, and a separator.

The Number of Elastic Portions Constituting an Elastic Member According to the Present Embodiment In the examples described above, the elastic member 40 includes two elastic portions that differ in elastic modulus. On the other hand, the present embodiment is not limited to this, and an elastic member may include three or more elastic portions, for example.

The above description concerns an example, and the present embodiment has unique effects in each of the following aspects.

Aspect 1

According to Aspect 1, a liquid discharge head (the liquid discharge head 10, for example) includes: a discharge port (the nozzle 14, for example) through which a liquid (ink, for example) is discharged; a valve body (the on-off valve 31, for example) that opens and closes the discharge port, and a drive unit (the piezoelectric element 32, for example) that opens and closes the valve body. The valve body includes an elastic member (the elastic member 40, for example) that comes into contact with the discharge port to stop the discharge of the liquid, and a core (the core 310, for example) having a support portion that supports the elastic member. The elastic member includes at least two portions that differ in elastic modulus.

Aspect 2

According to Aspect 2, in the liquid discharge head of Aspect 1, the elastic member includes a first elastic portion (the discharge-side elastic portion 401, 401*d*, 401*f*, 411, or 411*s*, for example) located on the side of the discharge port, and a second elastic portion (the core-side elastic portion 402 or 412, or the spring 402*a* or 402*b*, for example) that is located on the side of the core and has a different elastic modulus from the elastic modulus of the first elastic portion.

Aspect 3

According to Aspect 3, in the liquid discharge head of Aspect 2, the first elastic portion has a higher elastic modulus than the elastic modulus of the second elastic portion.

Aspect 4

According to Aspect 4, in the liquid discharge head of Aspect 3, the spring constant of the first elastic portion is 1 to 2 K/μm when the elastic member has a diameter of 0.5 to 1 mm and a thickness of 500 μm, and the spring constant of the second elastic portion is 0.05 to 1 K/μm when the elastic member has a diameter of 0.5 to 1 mm and a thickness of 500 μm.

Aspect 5

According to Aspect 5, in the liquid discharge head of Aspect 2, the second elastic portion has a higher elastic modulus larger than the elastic modulus of the first elastic portion.

Aspect 6

According to Aspect 6, in the liquid discharge head of Aspect 5, the spring constant of the first elastic portion is 0.05 to 1 N/μm when the elastic member has a diameter of 0.5 to 1 mm and a thickness of 500 μm, and the spring constant of the second elastic portion is 1 to 2 N/μm w % ben the elastic member has a diameter of 0.5 to 1 mm and a thickness of 500 μm.

Aspect 7

According to Aspect 7, in the liquid discharge head of Aspect 5 or 6, the liquid contains hard particles (a filler-containing ink, for example).

Aspect 8

According to Aspect 8, in the liquid discharge head of Aspect 2, at least one of the first elastic portion or the second elastic portion is either a resin member or a rubber member.

Aspect 9

According to Aspect 9, in the liquid discharge head of Aspect 2, the first elastic portion is either a resin member or a rubber member, and the second elastic portion is a spring.

Aspect 10

According to Aspect 10, in the liquid discharge head of Aspect 1, the support portion has a recess (the recess 312, for example) into which the elastic member is to be inserted.

Aspect 11

According to Aspect 11, in the liquid discharge head of Aspect 10, a predetermined gap (the gap 311, for example) is provided between the outer circumferential portion of the elastic member and the sidewall of the recess.

Aspect 12

According to Aspect 12, in the liquid discharge head of Aspect 10, part of the outer circumferential portion of the elastic member comes into contact with the sidewall of the recess.

Aspect 13

According to Aspect 13, in the liquid discharge head of Aspect 10, the core includes a holding member (the holding portion 310*a*, 310*b*, or 310*f*) for preventing the elastic member from coming off the recess toward the discharge port.

Aspect 14

According to Aspect 14, a liquid discharge apparatus (the liquid discharge apparatus 100, for example) includes: the liquid discharge head of any one of Aspects 1 to 13; a control unit; a liquid supply unit that supplies the liquid to the liquid discharge head; and a support unit (the carriage 1, for example) that supports the liquid discharge head.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A liquid discharge head, comprising:

a discharge port through which a liquid is discharged in a discharge direction;

a valve body to openably close the discharge port; and a driver coupled to the valve body to move the valve body in the discharge direction, wherein the valve body includes an elastic member including:

a first elastic portion having a first elastic modulus; and a second elastic portion having a second elastic modulus different from the first elastic modulus, the elastic member to contact the discharge port to close the discharge port; and a core attached to the elastic member to support the elastic member, the first elastic portion is closer to the discharge port than the second elastic portion in the discharge direction, the first elastic portion has a sheet-like shape, and the first elastic portion is fixed to the core by a holding plate.

2. The liquid discharge head of claim 1, wherein the second elastic portion is closer to the core than the first elastic portion in the discharge direction.

3. The liquid discharge head of claim 2, wherein the first elastic modulus of the first elastic portion is higher than the second elastic modulus of the second elastic portion.

4. The liquid discharge head of claim 3, wherein the first elastic portion has:

a diameter of 0.5 to 1 mm and a thickness of 450 to 500 μm; and a spring constant of 1 to 2 N/μm, and the second elastic portion has:

a diameter of 0.5 to 1 mm and a thickness of 50 to 500 μm; and a spring constant of 0.05 to 1 N/μm.

5. The liquid discharge head of claim 2, wherein the second elastic modulus of the second elastic portion is higher than the first elastic modulus of the first elastic portion.

6. The liquid discharge head of claim 5, wherein the first elastic portion has:

a diameter of 0.5 to 1 mm and a thickness of 450 to 500 μm; and a spring constant of 0.05 to 1 N/μm, and the second elastic portion has:

a diameter of 0.5 to 1 mm and a thickness of 50 to 500 μm; and a spring constant of 1 to 2 N/μm.

7. The liquid discharge head of claim 5, wherein the liquid contains fillers.

8. The liquid discharge head of claim 2, wherein at least one of the first elastic portion or the second elastic portion includes one of a resin member or a rubber member.

9. The liquid discharge head of claim 1, wherein the core has a recess into which the elastic member is insertable.

10. A liquid discharge apparatus comprising:

the liquid discharge head of claim 1;

a liquid supply unit to supply the liquid to the liquid discharge head;

a controller to control the liquid discharge head and the liquid supply unit; and a carriage to movably support the liquid discharge head.

11. The liquid discharge head of claim 1, wherein the holding plate applies a compression preload to the first elastic portion such that the first elastic portion is compressed to the core.

12. The liquid discharge head of claim 1, wherein the holding plate is disposed so as to cover a periphery of the core.

13. The liquid discharge head of claim 12, wherein the holding plate is pressure-bonded to the core by thermal contraction.

14. The liquid discharge head of claim 1, wherein the second elastic portion includes a projection that projects in the discharge direction, and the first elastic portion covers the projection.

15. The liquid discharge head of claim 1, wherein the first elastic portion comprises a fluororesin sheet.

* * * * *